United States Patent
Vandergon et al.

(10) Patent No.: US 12,051,316 B2
(45) Date of Patent: Jul. 30, 2024

(54) LIQUID JET CUTTING HEAD SENSOR SYSTEMS AND METHODS

(71) Applicant: Hypertherm, Inc., Hanover, NH (US)

(72) Inventors: Cedar Vandergon, New Brighton, MN (US); William Schultz, Shoreview, MN (US)

(73) Assignee: Hypertherm, Inc., Hanover, NH (US)

(*) Notice: Subject to any disclaimer, the term of this patent is extended or adjusted under 35 U.S.C. 154(b) by 108 days.

(21) Appl. No.: 17/125,819

(22) Filed: Dec. 17, 2020

(65) Prior Publication Data

US 2021/0192922 A1  Jun. 24, 2021

Related U.S. Application Data

(60) Provisional application No. 62/949,951, filed on Dec. 18, 2019.

(51) Int. Cl.
| | |
|---|---|
| G08B 25/00 | (2006.01) |
| B05B 12/00 | (2018.01) |
| B26F 3/00 | (2006.01) |
| G08B 7/06 | (2006.01) |
| G08B 21/18 | (2006.01) |

(52) U.S. Cl.
CPC ............ *G08B 21/18* (2013.01); *B05B 12/004* (2013.01); *B26F 3/004* (2013.01); *G08B 7/06* (2013.01)

(58) Field of Classification Search
USPC ............ 340/686.1, 690, 686.5, 691.1, 691.6, 340/693.4, 3.1, 3.42–3.43, 825.23, 7.32
See application file for complete search history.

(56) References Cited

U.S. PATENT DOCUMENTS

| | | | |
|---|---|---|---|
| 433,022 | A | 7/1890 | Noyes |
| 1,544,519 | A | 6/1925 | McKinley et al. |
| 1,554,406 | A | 9/1925 | Coberty |
| 1,684,431 | A | 9/1928 | Behee, Jr. |

(Continued)

FOREIGN PATENT DOCUMENTS

| | | |
|---|---|---|
| CN | 101630409 A | 1/2010 |
| CN | 201803832 U | 4/2011 |

(Continued)

OTHER PUBLICATIONS

Hashish, M., "Visualization of the Abrasive-Waterjet Cutting Process," from Experimental Mechanics Jun. 1988.

(Continued)

*Primary Examiner* — Daniel Previl
(74) *Attorney, Agent, or Firm* — Perkins Coie LLP

(57) ABSTRACT

An operational monitoring system for use with a liquid jet cutting system can include an accelerometer coupled to a cutting head of the liquid jet cutting system. The accelerometer can be configured to generate motion data associated with movement of the cutting head. The system can include a computing device operably connected to the accelerometer and having a memory and a processor. The memory can store a planned data set including expected parameters associated with movement of the cutting head along a planned cut path. In some embodiments, the computing device is configured to receive the motion data from the accelerometer and correlate the motion data to the planned data set.

33 Claims, 9 Drawing Sheets

(56) References Cited

U.S. PATENT DOCUMENTS

| | | |
|---|---|---|
| 1,937,408 A | 11/1933 | Johnson |
| 2,007,180 A | 7/1935 | Doran et al. |
| 2,009,932 A | 7/1935 | Aaron |
| 2,200,002 A | 5/1940 | Lane et al. |
| 2,308,347 A | 1/1943 | Asselin |
| 2,359,352 A | 10/1944 | Bucknam et al. |
| 2,376,287 A | 5/1945 | Thomas |
| 2,403,751 A | 7/1946 | Palmer |
| 2,456,041 A | 12/1948 | Edgar |
| 2,544,414 A | 3/1951 | Bridgman et al. |
| 2,558,035 A | 6/1951 | Bridgman |
| 2,819,835 A | 1/1958 | Newhall |
| 2,822,789 A | 2/1958 | Philips et al. |
| 2,951,369 A | 9/1960 | Newhall |
| 2,952,071 A | 9/1960 | Burt |
| 2,985,050 A | 5/1961 | Schwacha |
| 3,081,990 A | 3/1963 | Bromley |
| 3,086,749 A | 4/1963 | Frye |
| 3,088,854 A | 5/1963 | Spies, Jr. |
| 3,095,900 A | 7/1963 | Newhall |
| 3,106,169 A | 10/1963 | Prosser et al. |
| 3,137,978 A | 6/1964 | Incantalupo |
| 3,148,528 A | 9/1964 | Reynolds |
| 3,174,364 A | 3/1965 | Sims |
| 3,270,464 A | 9/1966 | Bowling, Jr. et al. |
| 3,296,855 A | 1/1967 | Newhall |
| 3,323,809 A | 6/1967 | Brookfield |
| 3,343,794 A | 9/1967 | Voitsekhovsky |
| 3,449,742 A | 6/1969 | Stapleton |
| 3,452,412 A | 7/1969 | Allman, Jr. et al. |
| 3,460,013 A | 8/1969 | Gaylor |
| 3,507,740 A | 4/1970 | Gaspari |
| 3,515,860 A | 6/1970 | Fitzgerald, Jr. |
| 3,519,998 A | 7/1970 | Barron |
| 3,521,853 A | 7/1970 | Gillis, Jr. |
| 3,530,273 A | 9/1970 | Bollinger et al. |
| 3,543,444 A | 12/1970 | Mehta |
| 3,548,170 A | 12/1970 | Bruce et al. |
| 3,548,172 A | 12/1970 | Centner |
| 3,564,971 A | 2/1971 | Wagner et al. |
| 3,593,459 A | 7/1971 | Kulischenko |
| 3,668,498 A | 6/1972 | Austin, Jr. |
| 3,705,693 A | 12/1972 | Franz |
| 3,708,936 A | 1/1973 | Rogers |
| 3,725,651 A | 4/1973 | Cutler |
| 3,746,256 A | 4/1973 | Laney |
| 3,750,961 A | 8/1973 | Franz |
| 3,756,106 A | 9/1973 | Chadwick et al. |
| 3,765,661 A | 10/1973 | Omura |
| 3,769,753 A | 11/1973 | Fleischer |
| 3,785,707 A | 1/1974 | Mitsuoka |
| 3,789,741 A | 2/1974 | Hallberg |
| 3,851,899 A | 12/1974 | Franz |
| 3,870,941 A | 3/1975 | Ikenga et al. |
| 3,918,331 A | 11/1975 | Svanstrom |
| 3,932,961 A | 1/1976 | Pagella et al. |
| 4,006,890 A | 2/1976 | Vainer et al. |
| 3,997,111 A | 12/1976 | Thomas et al. |
| 3,999,384 A | 12/1976 | Mohaupt |
| 4,009,860 A | 3/1977 | Lingnau |
| 4,026,322 A | 5/1977 | Thomas |
| 4,031,369 A | 6/1977 | Heaman et al. |
| 4,042,178 A | 8/1977 | Veltrup et al. |
| 4,048,918 A | 9/1977 | Peck |
| 4,050,001 A | 9/1977 | Kishi et al. |
| 4,066,944 A | 1/1978 | Leenhouts |
| 4,084,083 A | 1/1978 | Leenhouts |
| 4,075,789 A | 2/1978 | Dremann |
| 4,078,727 A | 3/1978 | Lingnau |
| 4,081,200 A | 3/1978 | Cheung |
| 4,081,892 A | 4/1978 | Mercer |
| 4,125,969 A | 11/1978 | Easton |
| 4,162,763 A | 7/1979 | Higgins |
| 4,164,183 A | 8/1979 | Peck |
| 4,192,343 A | 3/1980 | Grahac |
| 4,203,022 A | 5/1980 | Couch, Jr. et al. |
| 4,205,828 A | 6/1980 | Hooper et al. |
| 4,214,192 A | 7/1980 | Bromer et al. |
| 4,216,415 A | 8/1980 | Shimonou et al. |
| 4,216,906 A | 8/1980 | Olsen et al. |
| 4,216,911 A | 8/1980 | Huperz et al. |
| 4,237,913 A | 12/1980 | Maasberg |
| 4,246,838 A | 1/1981 | Pulver et al. |
| 4,253,610 A | 3/1981 | Larkin |
| 4,256,139 A | 3/1981 | Huperz et al. |
| 4,262,757 A | 4/1981 | Johnson, Jr. et al. |
| 4,272,017 A | 6/1981 | Franz |
| 4,277,229 A | 7/1981 | Pacht |
| 4,282,763 A | 8/1981 | Griebeler |
| 4,306,627 A | 12/1981 | Cheung et al. |
| 4,306,728 A | 12/1981 | Huperz et al. |
| 4,313,570 A | 2/1982 | Olsen |
| 4,326,937 A | 4/1982 | Neumeier et al. |
| 4,361,748 A | 11/1982 | Couch, Jr. |
| 4,371,001 A | 2/1983 | Olsen |
| 4,392,534 A | 7/1983 | Miida |
| 4,392,784 A | 7/1983 | Hanafi |
| 4,401,345 A | 8/1983 | Archibald |
| 4,404,507 A | 9/1983 | Dean et al. |
| 4,412,792 A | 11/1983 | LaBorde et al. |
| 4,415,867 A | 11/1983 | Rubin |
| 4,435,902 A | 3/1984 | Mercer et al. |
| 4,437,525 A | 3/1984 | O'Hanlon et al. |
| 4,447,178 A | 5/1984 | Esser |
| 4,456,132 A | 6/1984 | LaValle et al. |
| 4,456,440 A | 6/1984 | Korner |
| 4,456,863 A | 6/1984 | Matusek |
| 4,478,368 A | 10/1984 | Yie |
| 4,495,845 A | 1/1985 | Sherby |
| 4,524,544 A | 6/1985 | Habib |
| 4,534,427 A | 8/1985 | Wang et al. |
| 4,540,056 A | 9/1985 | O'Hanlon |
| 4,540,320 A | 9/1985 | Arnold |
| 4,545,157 A | 10/1985 | Saurwein |
| 4,555,758 A | 11/1985 | Inaba et al. |
| 4,555,872 A | 12/1985 | Yie |
| 4,557,245 A | 12/1985 | Bieri |
| 4,564,995 A | 1/1986 | Kase |
| 4,573,886 A | 3/1986 | Maasberg et al. |
| 4,574,825 A | 3/1986 | Haug |
| 4,578,748 A | 3/1986 | Abe et al. |
| 4,594,924 A | 6/1986 | Windisch |
| 4,598,380 A | 7/1986 | Holmes et al. |
| 4,600,985 A | 7/1986 | Nozawa et al. |
| 4,606,150 A | 8/1986 | Grimm |
| 4,614,128 A | 9/1986 | Fickler |
| 4,626,756 A | 12/1986 | Inaba et al. |
| 4,634,353 A | 1/1987 | Huperz |
| 4,644,460 A | 2/1987 | Kishi et al. |
| 4,648,215 A | 3/1987 | Hashish et al. |
| 4,651,601 A | 3/1987 | Sasaki |
| 4,660,773 A | 4/1987 | O'Hanlon |
| 4,665,944 A | 5/1987 | Wallace et al. |
| 4,666,803 A | 5/1987 | Yamazaki |
| 4,669,783 A | 6/1987 | Kolle |
| 4,674,239 A | 6/1987 | Jodoin |
| 4,680,519 A | 7/1987 | Chand |
| 4,697,769 A | 10/1987 | Blackwelder et al. |
| 4,715,538 A | 12/1987 | Lingnau |
| 4,716,350 A | 12/1987 | Huang et al. |
| 4,728,872 A | 3/1988 | Kishi et al. |
| 4,738,174 A | 4/1988 | Bloomquist |
| 4,741,680 A | 5/1988 | Broker et al. |
| 4,761,595 A | 8/1988 | Goor |
| 4,768,702 A | 9/1988 | Takahashi et al. |
| 4,776,769 A | 10/1988 | Hilaris |
| 4,785,027 A | 11/1988 | Brasington et al. |
| 4,787,049 A | 11/1988 | Hirata et al. |
| 4,798,094 A | 1/1989 | Newhall et al. |
| 4,802,312 A | 2/1989 | Glaeser et al. |
| 4,810,945 A | 3/1989 | Yoneda et al. |
| 4,815,241 A | 3/1989 | Woodson |
| 4,816,284 A | 3/1989 | Magee |
| 4,817,342 A | 4/1989 | Martin et al. |

(56) References Cited

U.S. PATENT DOCUMENTS

| | | |
|---|---|---|
| 4,817,874 A | 4/1989 | Jarzebowicz |
| 4,818,194 A | 4/1989 | Saurwein |
| 4,821,467 A | 4/1989 | Woodson et al. |
| 4,822,218 A | 4/1989 | Satoh |
| 4,823,550 A | 4/1989 | Decker |
| 4,852,800 A | 8/1989 | Murdock |
| 4,879,663 A | 11/1989 | Fuehrer |
| 4,893,753 A | 1/1990 | Munoz et al. |
| 4,899,602 A | 2/1990 | Fender |
| 4,903,213 A | 2/1990 | Buhler et al. |
| 4,907,371 A | 3/1990 | Shoda et al. |
| 4,912,385 A | 3/1990 | Kawamura et al. |
| 4,920,495 A | 4/1990 | Pilkington |
| 4,934,111 A | 6/1990 | Hasish et al. |
| 4,951,429 A | 8/1990 | Hashish et al. |
| 4,955,164 A | 9/1990 | Hashish et al. |
| 4,973,026 A | 11/1990 | Saurwein |
| 4,987,356 A | 1/1991 | Yamada et al. |
| 4,987,668 A | 1/1991 | Roesch |
| 5,018,670 A | 5/1991 | Chalmers |
| 5,037,276 A | 8/1991 | Tremoulet, Jr. |
| 5,037,277 A | 8/1991 | Tan |
| 5,051,555 A | 9/1991 | Porterfield et al. |
| 5,052,089 A | 10/1991 | Gadaud |
| 5,084,791 A | 1/1992 | Thanos et al. |
| 5,098,229 A | 3/1992 | Meier et al. |
| 5,107,630 A | 4/1992 | Lodewijk |
| 5,117,872 A | 6/1992 | Yie |
| 5,126,645 A | 6/1992 | Yoshimi et al. |
| 5,144,211 A | 9/1992 | Daggett et al. |
| 5,154,643 A | 10/1992 | Catania et al. |
| 5,162,016 A | 11/1992 | Malloy |
| 5,176,018 A | 1/1993 | Thompson |
| 5,177,421 A | 1/1993 | Sasaki et al. |
| 5,186,157 A | 2/1993 | Bieri |
| 5,186,393 A | 2/1993 | Yie |
| 5,199,642 A | 4/1993 | Rankin |
| 5,201,150 A | 4/1993 | Kuboyama et al. |
| 5,209,406 A | 5/1993 | Johnson |
| 5,212,430 A | 5/1993 | Jartyn |
| 5,214,972 A | 6/1993 | Larson et al. |
| 5,226,799 A | 7/1993 | Raghavan et al. |
| 5,232,155 A | 8/1993 | Chen |
| 5,236,459 A | 8/1993 | Koch et al. |
| 5,239,788 A | 8/1993 | Woodson |
| 5,249,161 A | 9/1993 | Jones et al. |
| 5,253,808 A | 10/1993 | Pacht |
| 5,286,006 A | 2/1994 | Ogura |
| 5,297,777 A | 3/1994 | Me |
| 5,315,222 A | 5/1994 | Kasagami et al. |
| 5,320,289 A | 6/1994 | Hashish et al. |
| 5,330,167 A | 7/1994 | Plumb |
| 5,331,264 A | 7/1994 | Cheng et al. |
| 5,335,459 A | 8/1994 | Dale |
| 5,351,714 A | 10/1994 | Barnowski |
| 5,372,540 A | 12/1994 | Burch et al. |
| 5,380,159 A | 1/1995 | Olsen et al. |
| 5,407,379 A | 4/1995 | Shank et al. |
| 5,413,270 A | 5/1995 | Lechervy et al. |
| 5,415,033 A | 5/1995 | Maresca, Jr. et al. |
| 5,441,441 A | 8/1995 | Cook et al. |
| 5,468,066 A | 11/1995 | Hammonds |
| 5,469,768 A | 11/1995 | Schumacher |
| 5,472,367 A | 12/1995 | Slocum et al. |
| 5,475,196 A | 12/1995 | Lisec |
| 5,481,260 A | 1/1996 | Buckler et al. |
| 5,484,325 A | 1/1996 | Shank |
| 5,505,653 A | 4/1996 | Nedo et al. |
| 5,508,596 A | 4/1996 | Olsen |
| 5,509,849 A | 4/1996 | Spears, Jr. |
| 5,524,821 A | 6/1996 | Yie et al. |
| 5,557,154 A | 9/1996 | Erhart |
| 5,564,469 A | 10/1996 | Tremoulet, Jr. et al. |
| 5,616,067 A | 4/1997 | Goenka |
| 5,636,789 A | 6/1997 | Shook |
| 5,643,058 A | 7/1997 | Erichsen et al. |
| 5,649,694 A | 7/1997 | Buck |
| 5,673,030 A | 9/1997 | Kosich |
| 5,679,058 A | 10/1997 | Rhoades |
| 5,682,309 A | 10/1997 | Bartusiak et al. |
| 5,704,824 A | 1/1998 | Hashish et al. |
| 5,719,480 A | 2/1998 | Bock et al. |
| 5,722,688 A | 3/1998 | Garcia |
| 5,727,773 A | 3/1998 | Dunnigan |
| 5,730,358 A | 3/1998 | Raghavan et al. |
| 5,730,635 A | 3/1998 | De Haas et al. |
| 5,740,081 A | 4/1998 | Suzuki |
| 5,759,086 A | 6/1998 | Klingel |
| 5,778,713 A | 7/1998 | Butler et al. |
| 5,782,673 A | 7/1998 | Warehime |
| 5,799,688 A | 9/1998 | Yie |
| 5,800,231 A | 9/1998 | De Haas et al. |
| 5,800,246 A | 9/1998 | Tomioka |
| 5,806,390 A | 9/1998 | Pomerleau et al. |
| 5,831,403 A | 11/1998 | Kanki et al. |
| 5,848,880 A | 12/1998 | Helmig |
| 5,848,929 A * | 12/1998 | Hoffman ............... B24B 31/108 451/32 |
| 5,854,744 A | 12/1998 | Zeng et al. |
| 5,865,576 A | 2/1999 | Arai et al. |
| 5,876,267 A | 3/1999 | Kanda |
| 5,892,345 A | 4/1999 | Olsen |
| 5,904,297 A | 5/1999 | Kendrick, Jr. |
| 5,908,349 A | 6/1999 | Warehime |
| 5,924,853 A | 7/1999 | Pacht |
| 5,927,329 A | 7/1999 | Yie |
| 5,970,996 A | 10/1999 | Markey et al. |
| 5,975,429 A | 11/1999 | Jezek |
| 5,986,425 A | 11/1999 | Onishi et al. |
| 6,077,152 A | 6/2000 | Warehime |
| 6,083,001 A | 7/2000 | Deardon et al. |
| 6,098,677 A | 8/2000 | Wegman et al. |
| 6,099,388 A | 8/2000 | Fritsch et al. |
| 6,120,351 A | 9/2000 | Zeng |
| 6,121,744 A | 9/2000 | Hoda et al. |
| 6,126,524 A | 10/2000 | Shepherd |
| 6,155,245 A | 12/2000 | Zanzur |
| 6,168,503 B1 | 1/2001 | Pao et al. |
| 6,201,207 B1 | 3/2001 | Maruyama et al. |
| 6,220,529 B1 | 4/2001 | Xu |
| 6,222,155 B1 | 4/2001 | Blackmon |
| 6,227,087 B1 | 5/2001 | Thorsen et al. |
| 6,243,625 B1 | 6/2001 | Wyatt et al. |
| 6,244,927 B1 | 6/2001 | Zeng |
| 6,247,422 B1 | 6/2001 | Murray, III |
| 6,276,993 B1 | 8/2001 | Miller |
| 6,280,302 B1 | 8/2001 | Hashish et al. |
| 6,283,832 B1 | 9/2001 | Shepherd |
| 6,283,833 B1 | 9/2001 | Pao et al. |
| 6,299,510 B1 | 10/2001 | Massenburg |
| 6,328,638 B1 | 12/2001 | Hopkins et al. |
| 6,333,487 B1 | 12/2001 | Maruyama |
| 6,361,416 B1 | 3/2002 | Hopkins et al. |
| 6,379,214 B1 | 4/2002 | Stewart et al. |
| 6,415,820 B1 | 7/2002 | Gluf, Jr. |
| 6,425,804 B1 | 7/2002 | Pettit et al. |
| 6,425,805 B1 | 7/2002 | Massa et al. |
| 6,430,787 B1 | 8/2002 | Becan et al. |
| 6,431,465 B1 | 8/2002 | Yie |
| 6,494,240 B1 | 12/2002 | Brisson |
| 6,511,368 B1 | 1/2003 | Halley |
| D470,566 S | 2/2003 | Sciulli et al. |
| 6,533,640 B1 | 3/2003 | Nopwaskey et al. |
| 6,533,643 B1 | 3/2003 | Feng |
| 6,540,586 B2 | 4/2003 | Sciulli |
| 6,588,724 B2 | 7/2003 | Yie |
| 6,616,372 B2 | 9/2003 | Seroka et al. |
| 6,619,570 B1 | 9/2003 | Ericksen et al. |
| 6,676,039 B2 | 1/2004 | Lindsey et al. |
| 6,684,133 B2 | 1/2004 | Frye-Hammelmann et al. |
| 6,705,921 B1 | 3/2004 | Shepherd |
| 6,752,685 B2 | 6/2004 | Ulrich |
| 6,766,216 B2 | 7/2004 | Erichsen et al. |
| 6,785,010 B2 | 8/2004 | Kimba et al. |

(56) References Cited

U.S. PATENT DOCUMENTS

| | | | |
|---|---|---|---|
| 6,802,541 B2 | 10/2004 | Hopinks et al. |
| 6,812,665 B2 | 11/2004 | Gan et al. |
| 6,819,974 B1 | 11/2004 | Coleman et al. |
| 6,845,295 B2 | 1/2005 | Cheng et al. |
| 6,852,002 B2 | 2/2005 | Stewart et al. |
| 6,870,346 B2 | 3/2005 | Davidov |
| 6,879,415 B2 | 4/2005 | Kurosawa |
| 6,905,396 B1 | 6/2005 | Miller et al. |
| 6,922,605 B1 | 7/2005 | Olsen |
| 6,932,285 B1 | 8/2005 | Zeng |
| 6,959,908 B2 | 11/2005 | Isbitsky |
| 7,033,256 B2 | 4/2006 | Miller |
| 7,035,708 B1 | 4/2006 | Olsen |
| 7,040,959 B1 | 5/2006 | Panuska et al. |
| 7,074,112 B2 | 7/2006 | Olsen |
| 7,083,124 B2 | 8/2006 | Bednorz et al. |
| 7,094,135 B2 | 8/2006 | Chisum et al. |
| 7,162,943 B1 | 1/2007 | Reitmeyer et al. |
| 7,207,868 B2 | 4/2007 | Takehara et al. |
| 7,216,003 B2 | 5/2007 | Faulkner et al. |
| 7,331,842 B2 | 2/2008 | Sciulli et al. |
| 7,357,697 B2 | 4/2008 | Massa et al. |
| 7,383,896 B2 | 6/2008 | Tibbitts |
| 7,386,262 B2 | 6/2008 | Okamura et al. |
| 7,419,418 B2 | 9/2008 | Alberts et al. |
| 7,464,630 B2 | 12/2008 | Knaupp et al. |
| 7,485,027 B2 | 2/2009 | Miller |
| 7,489,984 B2 | 2/2009 | Jackman et al. |
| 7,503,134 B2 * | 3/2009 | Buckner ............... E01H 1/0827 15/300.1 |
| 7,537,019 B2 | 5/2009 | Ting et al. |
| 7,544,112 B1 | 6/2009 | Miller et al. |
| 7,560,892 B2 | 7/2009 | Shibasaki et al. |
| 7,585,201 B2 | 9/2009 | Kanai et al. |
| 7,594,614 B2 | 9/2009 | Vijay et al. |
| 7,703,363 B2 | 4/2010 | Knaupp et al. |
| 7,748,373 B2 | 7/2010 | Toncelli |
| 7,757,786 B2 | 7/2010 | Harder et al. |
| 7,815,490 B2 | 10/2010 | Liu |
| 7,832,481 B2 | 11/2010 | Martindale |
| 7,896,726 B1 | 3/2011 | Miller et al. |
| 7,917,017 B2 | 3/2011 | Kanamori |
| 7,938,713 B2 | 5/2011 | Trieb et al. |
| 8,024,068 B2 | 9/2011 | Gray |
| 8,123,591 B2 | 2/2012 | Olsen |
| 8,240,634 B2 | 8/2012 | Jarchau et al. |
| 8,277,206 B2 | 10/2012 | Raghavan et al. |
| 8,308,525 B2 | 11/2012 | Hashish et al. |
| 8,342,912 B2 | 1/2013 | Funatsu et al. |
| 8,401,692 B2 | 3/2013 | Knaupp et al. |
| 8,423,172 B2 | 4/2013 | Erichsen et al. |
| 8,439,726 B2 | 5/2013 | Miller |
| 8,534,787 B2 | 9/2013 | Yafe |
| 8,541,710 B2 | 9/2013 | Brandt et al. |
| 8,573,244 B2 | 11/2013 | Taylor |
| 8,593,086 B2 | 11/2013 | Hay et al. |
| 8,651,920 B2 | 2/2014 | Hashish |
| 8,676,372 B1 | 3/2014 | Bolin et al. |
| 8,768,516 B2 | 7/2014 | Diolaiti et al. |
| 8,821,213 B2 | 9/2014 | Liu et al. |
| 8,892,236 B2 | 11/2014 | Olsen |
| 8,904,912 B2 | 12/2014 | Raghavan et al. |
| 8,920,213 B2 | 12/2014 | Liu |
| 9,003,955 B1 | 4/2015 | Stang et al. |
| 9,011,204 B2 | 4/2015 | Raghavan et al. |
| 9,044,873 B2 | 6/2015 | Guglielmetti et al. |
| 9,050,704 B1 | 6/2015 | Liu et al. |
| 9,067,331 B2 | 6/2015 | Stang |
| 9,090,808 B1 | 7/2015 | Liu et al. |
| 9,095,955 B2 | 8/2015 | Raghavan et al. |
| 9,108,297 B2 | 8/2015 | Schubert et al. |
| 9,138,863 B2 | 9/2015 | Schubert et al. |
| 9,163,617 B2 | 10/2015 | Mann |
| 9,232,959 B2 | 1/2016 | Aljuri et al. |
| 9,273,682 B2 | 3/2016 | Stang |
| 9,283,656 B2 | 3/2016 | Schubert et al. |
| 9,492,908 B2 | 11/2016 | Schubert et al. |
| 9,573,289 B2 | 2/2017 | Hashish et al. |
| 9,586,306 B2 | 3/2017 | Henning et al. |
| 9,610,674 B2 | 4/2017 | Raghavan et al. |
| 9,636,799 B2 | 5/2017 | Liu et al. |
| 9,638,357 B1 | 5/2017 | Raghavan et al. |
| 9,649,744 B2 | 5/2017 | Raghavan et al. |
| 9,658,613 B2 | 5/2017 | Henning et al. |
| 9,720,399 B2 | 8/2017 | Henning et al. |
| 9,727,051 B2 | 8/2017 | Henning et al. |
| 9,772,620 B2 | 9/2017 | Henning et al. |
| 9,793,599 B2 | 10/2017 | Di Nallo et al. |
| 9,810,205 B2 | 11/2017 | Raghavan et al. |
| 9,827,649 B2 | 11/2017 | Schubert et al. |
| 9,862,073 B2 | 1/2018 | Niblock |
| 9,891,617 B2 | 2/2018 | Henning et al. |
| 9,976,675 B1 | 5/2018 | Raghavan et al. |
| 9,989,954 B2 | 6/2018 | Henning et al. |
| 9,993,934 B2 | 6/2018 | Vandergon et al. |
| 10,010,999 B2 | 7/2018 | Raghavan et al. |
| 10,048,676 B2 | 8/2018 | Henning et al. |
| 10,054,118 B2 | 8/2018 | Hopkins |
| 10,146,209 B2 | 12/2018 | Henning et al. |
| 10,209,107 B2 | 2/2019 | Oki |
| 10,430,038 B2 | 10/2019 | Williams |
| 10,525,569 B2 * | 1/2020 | Linde ....................... B24C 3/32 |
| 10,541,189 B2 | 1/2020 | Ishihara et al. |
| 10,564,627 B2 | 2/2020 | Henning et al. |
| 10,573,403 B2 | 2/2020 | Su et al. |
| 10,606,240 B2 | 3/2020 | Henning et al. |
| 10,642,252 B2 | 5/2020 | Henning et al. |
| 10,656,622 B2 | 5/2020 | Henning et al. |
| 10,664,357 B1 | 5/2020 | Mallik et al. |
| 10,675,733 B2 | 6/2020 | Zhang et al. |
| 10,780,551 B2 | 9/2020 | Zhang et al. |
| 10,801,651 B2 | 10/2020 | Olsen et al. |
| 10,808,688 B1 | 10/2020 | Raghavan et al. |
| 10,859,997 B1 | 12/2020 | Miles et al. |
| 10,864,613 B2 | 12/2020 | Raghavan et al. |
| 10,983,503 B2 | 4/2021 | Henning et al. |
| 10,990,080 B2 | 4/2021 | Henning et al. |
| 11,125,360 B2 | 9/2021 | Raghavan et al. |
| D934,920 S | 11/2021 | Farnsworth et al. |
| 11,224,987 B1 | 1/2022 | Guglielmetti |
| 11,630,433 B1 | 4/2023 | Miles et al. |
| 2001/0002562 A1 | 6/2001 | Moutafis et al. |
| 2001/0015514 A1 | 8/2001 | Babai |
| 2001/0030245 A1 | 10/2001 | Lindsey et al. |
| 2002/0011092 A1 | 1/2002 | Hara et al. |
| 2002/0056347 A1 | 5/2002 | Signey et al. |
| 2002/0066345 A1 | 6/2002 | Shepherd et al. |
| 2002/0099835 A1 | 7/2002 | Chen |
| 2003/0034122 A1 | 2/2003 | Asai |
| 2003/0057295 A1 | 3/2003 | Helmig |
| 2003/0065424 A1 | 4/2003 | Erichsen et al. |
| 2003/0085295 A1 | 5/2003 | Dijkman et al. |
| 2003/0106591 A1 | 6/2003 | Saurwein et al. |
| 2003/0106594 A1 | 6/2003 | Saurwein et al. |
| 2003/0107021 A1 | 6/2003 | Saurwein et al. |
| 2003/0148709 A1 | 8/2003 | Anand et al. |
| 2004/0107810 A1 | 6/2004 | Sciulli et al. |
| 2004/0108000 A1 | 6/2004 | Raghavan et al. |
| 2005/0017091 A1 | 1/2005 | Olsen |
| 2005/0048873 A1 | 3/2005 | Alberts et al. |
| 2005/0098963 A1 | 5/2005 | Olsen et al. |
| 2005/0172815 A1 | 8/2005 | Betting et al. |
| 2005/0252352 A1 | 11/2005 | Tateiwa |
| 2006/0223423 A1 | 10/2006 | Dorfman et al. |
| 2006/0237672 A1 | 10/2006 | Moreno et al. |
| 2006/0278613 A1 | 12/2006 | Hess |
| 2007/0021039 A1 | 1/2007 | Haslett |
| 2007/0037496 A1 | 2/2007 | Habermann et al. |
| 2007/0063066 A1 | 3/2007 | Vijay et al. |
| 2007/0131455 A1 | 6/2007 | Blange |
| 2007/0155289 A1 | 7/2007 | Miller |
| 2007/0203858 A1 | 8/2007 | Olsen et al. |
| 2007/0218808 A1 | 9/2007 | Shimizu et al. |
| 2007/0267996 A1 | 11/2007 | Shibasaki et al. |

(56) References Cited

U.S. PATENT DOCUMENTS

| | | |
|---|---|---|
| 2008/0033593 A1 | 2/2008 | Dufort |
| 2008/0060493 A1 | 3/2008 | Liu |
| 2008/0103629 A1 | 5/2008 | Milanovic et al. |
| 2008/0110311 A1 | 5/2008 | Stangherlin |
| 2008/0169581 A1 | 7/2008 | Fukushima |
| 2008/0282855 A1 | 11/2008 | Kanai |
| 2009/0013839 A1 | 1/2009 | Kanai et al. |
| 2009/0064832 A1 | 3/2009 | Caretta et al. |
| 2009/0071303 A1 | 3/2009 | Hashish et al. |
| 2009/0124169 A1 | 5/2009 | Alberts et al. |
| 2009/0200084 A1 | 8/2009 | Vuyk et al. |
| 2009/0258582 A1 | 10/2009 | Miller et al. |
| 2009/0272245 A1 | 11/2009 | Voice et al. |
| 2009/0272409 A1 | 11/2009 | Petit |
| 2009/0288532 A1 | 11/2009 | Hashish |
| 2009/0311944 A1 | 12/2009 | Olsen |
| 2009/0318064 A1 | 12/2009 | Hashish |
| 2009/0325468 A1 | 12/2009 | El-Wardany et al. |
| 2010/0003894 A1 | 1/2010 | Miller et al. |
| 2010/0066786 A1 | 3/2010 | Yafe |
| 2010/0124872 A1 | 5/2010 | Hashish et al. |
| 2010/0227305 A1 | 9/2010 | Bakir |
| 2010/0267314 A1 | 10/2010 | Cveticanin et al. |
| 2010/0269593 A1 | 10/2010 | Moser et al. |
| 2010/0326271 A1 | 12/2010 | Stang |
| 2011/0027032 A1 | 2/2011 | Keller et al. |
| 2011/0060439 A1 | 3/2011 | Lukis et al. |
| 2011/0135505 A1 | 6/2011 | Kieninger et al. |
| 2011/0269382 A1 | 11/2011 | Deleris |
| 2011/0287692 A1 | 11/2011 | Erichsen et al. |
| 2011/0294401 A1 | 12/2011 | Habermann et al. |
| 2012/0021676 A1 | 1/2012 | Schubert et al. |
| 2012/0022839 A1 | 1/2012 | Valicek et al. |
| 2012/0065769 A1 | 3/2012 | Knaupp et al. |
| 2012/0085211 A1 | 4/2012 | Liu et al. |
| 2012/0091382 A1 | 4/2012 | Yie |
| 2012/0196516 A1 | 8/2012 | Funatsu et al. |
| 2012/0199218 A1 | 8/2012 | Gioberti et al. |
| 2012/0217011 A1 | 8/2012 | Dotson et al. |
| 2012/0238188 A1 | 9/2012 | Miller |
| 2012/0252325 A1 | 10/2012 | Schubert et al. |
| 2012/0252326 A1 | 10/2012 | Schubert et al. |
| 2012/0282845 A1 | 11/2012 | Whang et al. |
| 2012/0309268 A1 | 12/2012 | Summers et al. |
| 2013/0025422 A1 | 1/2013 | Chillman et al. |
| 2013/0123982 A1 | 5/2013 | Chiu et al. |
| 2013/0167697 A1 | 7/2013 | Reukers |
| 2013/0267152 A1 | 10/2013 | Tera et al. |
| 2013/0345853 A1 | 12/2013 | Berman et al. |
| 2014/0030963 A1 | 1/2014 | Kanazawa et al. |
| 2014/0045409 A1 | 2/2014 | Zhang et al. |
| 2014/0046477 A1* | 2/2014 | Brahan ................ G05B 19/404 700/170 |
| 2014/0051334 A1 | 2/2014 | Raghavan et al. |
| 2014/0087631 A1 | 3/2014 | Raghavan et al. |
| 2014/0203103 A1 | 7/2014 | Pitman |
| 2014/0252684 A1 | 9/2014 | Swanson et al. |
| 2014/0273768 A1 | 9/2014 | Guglielmetti et al. |
| 2015/0030088 A1 | 1/2015 | Chan et al. |
| 2015/0053075 A1 | 2/2015 | Rabhi |
| 2015/0107075 A1 | 4/2015 | Clarke et al. |
| 2015/0134093 A1 | 5/2015 | Dos Reis Alipio Da Cruz |
| 2015/0205289 A1 | 7/2015 | Henning et al. |
| 2015/0205290 A1 | 7/2015 | Henning |
| 2015/0205291 A1 | 7/2015 | Henning |
| 2015/0205292 A1 | 7/2015 | Henning |
| 2015/0205293 A1* | 7/2015 | Henning ............ G05B 19/4145 700/97 |
| 2015/0205295 A1 | 7/2015 | Henning et al. |
| 2015/0205296 A1 | 7/2015 | Henning et al. |
| 2015/0239059 A1* | 8/2015 | Myers ................ B23K 26/702 219/121.44 |
| 2015/0251267 A1 | 9/2015 | Winn et al. |
| 2015/0251331 A1 | 9/2015 | Vandergon et al. |
| 2015/0360344 A1 | 12/2015 | Raghavan et al. |
| 2016/0037550 A1 | 2/2016 | Barabell et al. |
| 2016/0059384 A1 | 3/2016 | Niblock |
| 2016/0184996 A1 | 6/2016 | Ishige et al. |
| 2016/0223138 A1 | 8/2016 | Iijima |
| 2016/0279800 A1 | 9/2016 | Onda |
| 2017/0165810 A1 | 6/2017 | Zhang et al. |
| 2017/0170435 A1* | 6/2017 | Harjee ................ H10K 71/811 |
| 2017/0190021 A1 | 7/2017 | Zhang et al. |
| 2017/0226842 A1 | 8/2017 | Omont et al. |
| 2017/0255184 A1 | 9/2017 | Henning et al. |
| 2017/0297168 A1 | 10/2017 | Raghavan et al. |
| 2017/0322543 A1 | 11/2017 | Henning et al. |
| 2018/0059638 A1 | 3/2018 | Rydh |
| 2018/0088558 A1 | 3/2018 | Henning et al. |
| 2018/0107193 A1 | 4/2018 | Henning et al. |
| 2018/0150049 A1 | 5/2018 | Schranz et al. |
| 2018/0161958 A1 | 6/2018 | Schubert et al. |
| 2018/0164783 A1 | 6/2018 | Henning et al. |
| 2018/0222057 A1 | 8/2018 | Mizobe |
| 2018/0257253 A1* | 9/2018 | Vandergon ............ B26F 3/004 |
| 2018/0315158 A1 | 11/2018 | Nurvitadhi et al. |
| 2018/0320802 A1 | 11/2018 | Raghavan et al. |
| 2018/0364679 A1 | 12/2018 | Henning et al. |
| 2019/0015928 A1 | 1/2019 | Hagenlocher et al. |
| 2019/0048988 A1 | 2/2019 | Besser et al. |
| 2019/0077017 A1 | 3/2019 | Shimodaira |
| 2019/0101894 A1 | 4/2019 | Henning et al. |
| 2019/0249805 A1* | 8/2019 | Olsen .................... B24C 7/0007 |
| 2019/0325779 A1 | 10/2019 | Meess et al. |
| 2019/0372449 A1 | 12/2019 | Mills |
| 2020/0007254 A1 | 1/2020 | Hay et al. |
| 2020/0089190 A1 | 3/2020 | Vandergon et al. |
| 2020/0106424 A1 | 4/2020 | Venugopal |
| 2020/0122295 A1 | 4/2020 | Lerea et al. |
| 2020/0217044 A1* | 7/2020 | Martel ................ E02F 3/9218 |
| 2020/0406424 A1* | 12/2020 | Zhang .................... G01F 22/00 |
| 2021/0039259 A1 | 2/2021 | Duprez |
| 2021/0046610 A1 | 2/2021 | Schubert et al. |
| 2021/0187778 A1 | 6/2021 | Denney et al. |
| 2021/0192922 A1 | 6/2021 | Vandergon et al. |
| 2021/0221534 A1 | 7/2021 | Henning et al. |
| 2021/0255613 A1 | 8/2021 | Mizobuchi |
| 2021/0291332 A1 | 9/2021 | Vandergon et al. |
| 2021/0299903 A1 | 9/2021 | Osterhouse |
| 2021/0299904 A1 | 9/2021 | Osterhouse |
| 2021/0301936 A1 | 9/2021 | Osterhouse et al. |
| 2022/0057774 A1 | 2/2022 | Vandergon et al. |
| 2023/0120907 A1 | 4/2023 | Miles et al. |

FOREIGN PATENT DOCUMENTS

| | | |
|---|---|---|
| CN | 104625969 A | 5/2015 |
| CN | 105945948 A | 9/2016 |
| CN | 105945966 A | 9/2016 |
| CN | 106019232 A | 10/2016 |
| CN | 106488358 A | 3/2017 |
| CN | 106287240 B | 10/2018 |
| CN | 108980638 A | 12/2018 |
| CN | 109087720 A | 12/2018 |
| CN | 109469837 A | 3/2019 |
| CN | 109654384 A | 4/2019 |
| DE | 4422691 A1 | 1/1996 |
| DE | 10214251 C1 | 8/2003 |
| DE | 112019005484 T5 | 8/2021 |
| EP | 0165690 A2 | 12/1985 |
| EP | 1116543 A2 | 7/2001 |
| EP | 2236893 A3 | 1/2011 |
| EP | 2584419 A2 | 4/2013 |
| FR | 2659264 A1 | 3/1990 |
| GB | 2198975 A | 6/1988 |
| JP | 2012157956 A | 8/2012 |
| JP | 2019119005 A | 7/2019 |
| TW | I544982 B | 8/2016 |
| WO | 1994025209 A1 | 11/1994 |
| WO | 2002085572 A1 | 10/2002 |
| WO | 2003011524 A1 | 2/2003 |
| WO | 2003064118 A1 | 8/2003 |
| WO | 03089999 A1 | 10/2003 |
| WO | 2003089999 A1 | 10/2003 |

(56) References Cited

FOREIGN PATENT DOCUMENTS

| | | | |
|---|---|---|---|
| WO | 2009050251 | A1 | 4/2009 |
| WO | 2010060459 | A1 | 6/2010 |
| WO | 2011042244 | A2 | 4/2011 |
| WO | 2013109473 | A1 | 7/2013 |
| WO | 2015164459 | A1 | 10/2015 |
| WO | 2017048788 | A1 | 3/2017 |
| WO | 2017203279 | A1 | 11/2017 |
| WO | 2018133494 | A1 | 7/2018 |
| WO | 2019086634 | A1 | 5/2019 |
| WO | 2020064974 | A1 | 4/2020 |
| WO | 2020087129 | A1 | 5/2020 |
| WO | 2020128090 | A1 | 6/2020 |

OTHER PUBLICATIONS

Olsen, J. et al., Advanced Error Correction Methodology Applied to Abrasive Waterjet Cutting, 2003, WJTA American WaterJet Conference, OMAX Corporation, Kent, Washington, USA, Aug. 2003, pp. 1-15.

Hashish, M., "Waterjet Machine Tool of the Future," 9th American Waterjet Conference, Aug. 23-26, 1997, paper 58, 15 pages.

"Memory waterjet milling," available from http://www.computescotland.com/memory-water-jet-milling-5236.php , Apr. 24, 2012, 4 pages.

Miller, D.S., "New Abrasive Waterjet Systems to Compete With Lasers," 2005 WJTA American Waterjet Conference, Aug. 21-23, 2005, Houston, Texas, 11 pages.

Genuine Flow Parts—87K High-Pressure Cylinder, Pump Type Compatability, 94k HyperJet, Flow Shape Technologies Group, copyright 2021 Flow International Corporation, https://flowparts.com/collections/high-pressure-components/products/cylinder-hp-cartridge-87k-2-0-intn [last accessed Feb. 26, 2021].

Waterjet Cutting Head Parts 60k High Pressure HP Cylinder body for Jet Edge / Sunrise Water Jet Head Intensifier Pump, SR20004, Guangzhou perfect machinery tec co., ltd., AliExpress, copyright 2010-2020 AliExpress.com, https://www.aliexpress.com/item/33039960455.html [last accessed Feb. 26, 2021].

Omron Industrial Automation, "Servomotors/Servo Drives," 2016, https://web.archive.org/web/20160801203451/https://www.ia.omron.com/support/guide/14/introduction.html, 4 pages.

Tech Briefs, "The Basics of Encoder Selection," Feb. 1, 2017, https://www.techbriefs.com/component/content/article/tb/supplements/md/features/articles/26431 , 8 pages.

European Patent Office International Search Authority, International Search Report and Written Opinion dated Apr. 1, 2021 for PCT/US2020/065722 filed Dec. 17, 2020, Applicant: Hypertherm, Inc., 18 pages.

Kovacevic, R., "State of the Art of Research and Development in Abrasive Waterjet Machining," Transactions of the ASME, vol. 119, Nov. 1997, pp. 776-785.

Bullock, Thomas B., "Motion Control and Industrial Controllers," Motion Control, Sep./Oct. 1990.

KERN Laser Systems, "3D Laser Engraving System," http://www.kernlasers.com/3d_laser_engraving.htm, downloaded on Oct. 5, 2010.

Epilog Laser 2009, Zing Laser 3D Engraving, http://www.epiloglaser.com/zing_3d_engraving.htm, downloaded on Oct. 5, 2010.

Custom Fabricator PIW Corporation Couples 'Tool Box' of Innovation, High Tech Equipment and Craftsmanship with SWAT Team Approach, JetEdge, Waterjet Success Stories, Case Studies, 2010, 4 pages.

Henning, A., "Cutting-edge quality improvements through geometrical modelling," @ BHR Group 1998 Jetting Technology, pp. 321-328.

"Better Cutting with Jetting," 14th International Conference, Jetting Technology, Brugge, Belgium: Sep. 21-23, 1998, @ BHR Group Limited, 6 pages.

Hydraulics & Pneumatics, Serving Fluid Power and Motion Control Engineers Worldwide, @2010 Penton Media, Inc. & Hydraulics & Pneumatics magazine, 2 pages.

OMAX Accessory Specifications A-Jet, Precision Abrasive Waterjet Accessories, Jan. 2010, 1 page.

Pilkey, Walter D., "Peterson's Stress Concentration Factors," Second Edition, John Wiley & Sons, Inc., copyright 1997, pp. 175-185, 204-207, 211-216, 256-257, 284, 287-301, 318-322, 326, 362, 370.

Savin, G.N., "Stress Concentration Around Holes," Pergamon Press, 1961, pp. 72-80, 104-112, 123-142, 205-225.

Stephens, Ralph et al., "Metal Fatigue in Engineering," Second Edition, John Wiley & Sons, Inc., copyright 2001, Chapter 7, pp. 186-193.

Stress Concentration-Wikipedia, http:Wikipedia.org/wiki/Stress_concentration, accessed Oct. 5, 2011, 3 pages.

Timoshenko, S.P. et al. "Theory of Elasticity," Third Edition, McGraw Hill Book Company, Copyright 1934, pp. 90-97, 181-194, 209-217.

* cited by examiner

LIQUID JET CUTTING HEAD SENSOR SYSTEMS AND METHODS

CROSS-REFERENCE TO RELATED APPLICATIONS INCORPORATED BY REFERENCE

The present application claims priority to U.S. Provisional App. No. 62/949,951, titled PREDICTIVE LIQUID JET CUTTING HEAD OPERATION AND MAINTENANCE USING SENSORS, which was filed on Dec. 18, 2019, and is incorporated herein by reference in its entirety.

TECHNICAL FIELD

The present disclosure is generally related to systems and methods for monitoring and diagnosing performance characteristics of a liquid jet cutting system.

BACKGROUND

Current liquid jet cutting system operation and practice requires an operator to continually monitor the cutting process to detect problems such as a clogged abrasive flow, a nozzle collision with a workpiece (throwing off accuracy and/or breaking the nozzle itself), water backing up in to the abrasive line (e.g., via material warping and thus the nozzle "kissing" the material), a failed orifice, etc. Some experienced operators can detect these types of failures through changes in audible noise. However, manual monitoring of these types of visual and/or audio conditions is a tedious and time involved task for an operator/technician who could be performing other more value-added tasks. Often in the operation of these liquid jet cutting systems, operators do not have enough bandwidth to continuously monitor the operation. Considering the aforementioned issues, as well as other errors and failures associated with abrasive feed systems, the inability to quickly and automatically detect failures can result in scrapped workpieces and wasted operational time.

DETAILED DESCRIPTION

The following disclosure describes various embodiments of operational monitoring systems for liquid jet cutting systems. The operational monitoring systems can generally include one or more sensors configured to monitor characteristics (e.g., movement, sounds, temperature, etc.) of components of the liquid jet cutting system. Data generated by the sensors can be collected by a computing device (e.g., a controller). The collected data can be correlated with planned data (e.g., threshold data) associated with the cut plan of the liquid jet cutting system. In some embodiments, data collected by one sensor is correlated with data collected by another sensor. The computing device can use the correlations between the collected data and planned data, or correlations between collected data of two or more sensors, to automatically predict and detect wear, failure conditions, and/or other phenomena of interest from the components of the liquid jet cutting system. In some embodiments, the computing device is configured to automatically generate alarm signals and/or shut down all or portions of the liquid jet system when certain failures or other phenomena (e.g., resonant frequencies, leaks, etc.) are detected or predicted. Automatic alarm generation and/or shut down can reduce the risk of damage to workpieces and/or to components of the liquid jet cutting system.

In the Figures, identical reference numbers identify identical, or at least generally similar, elements. To facilitate the discussion of any particular element, the most significant digit or digits of any reference number refers to the Figure in which that element is first introduced. For example, element 240 is first introduced and discussed with reference to FIG. 2.

Figure 1:
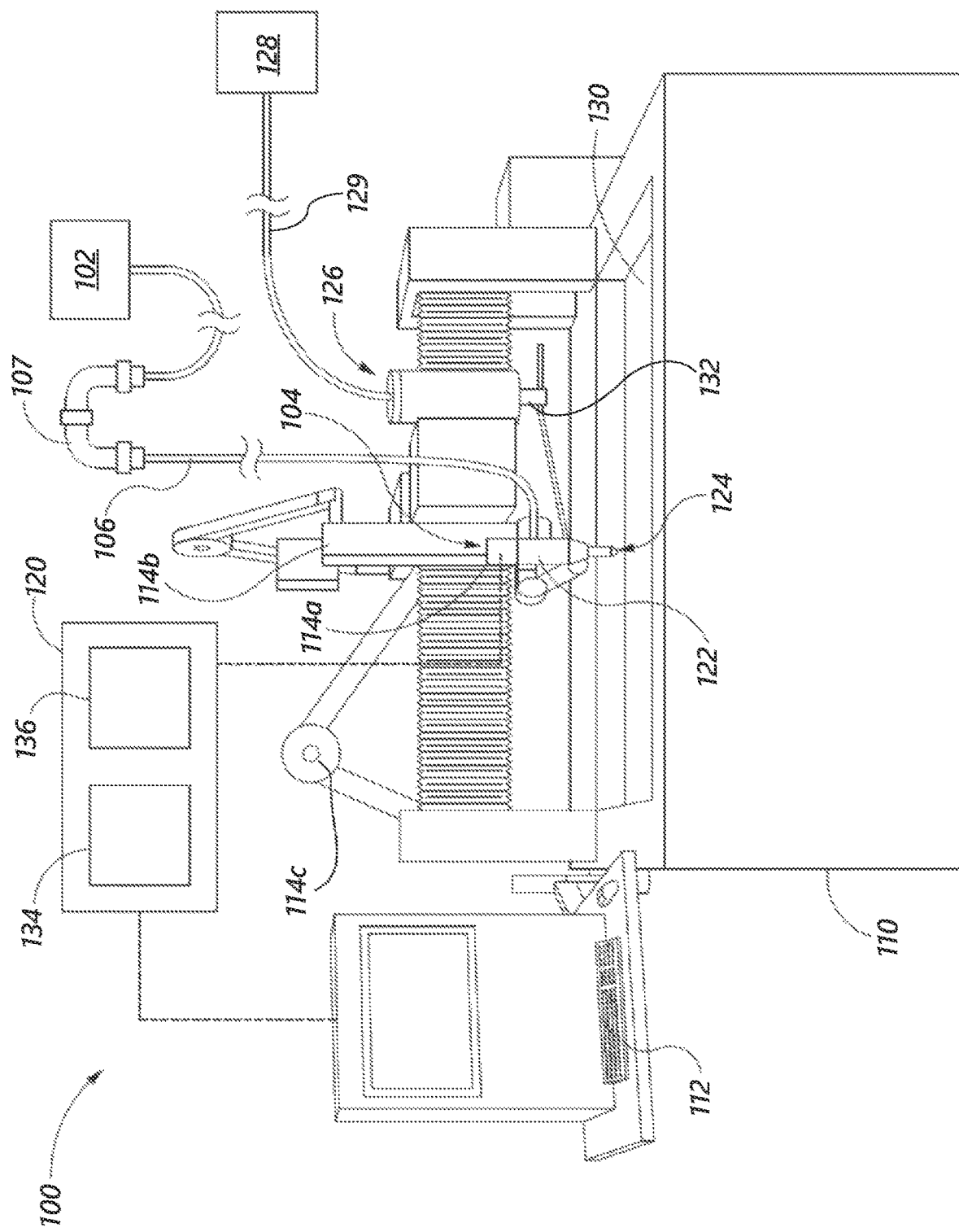
FIG. 1 is perspective and partially schematic view of a liquid jet cutting system, configured in accordance with embodiments of the present technology.

FIG. 1 is a perspective and partially schematic view of a liquid jet cutting system 100, configured in accordance with embodiments of the present technology. The system 100 can include a fluid supply assembly 102 (shown schematically). The fluid supply assembly 102 can include, for example, a fluid container, a pump, an intensifier, an accumulator, one or more valves, and/or one or more hydraulic units. The fluid supply assembly 102 can be configured to provide pressurized fluid to the system 100. In various embodiments, the system 100 uses various fluids including, e.g., water and/or gases.

The system 100 further includes a cutting head assembly 104 operably connected to the fluid supply assembly 102 and one or more conduits 106 extending between the fluid supply assembly 102 and the cutting head assembly 104. In some embodiments, the conduit 106 includes one or more joints 107 (e.g., a swivel joint or another suitable joint having two or more degrees of freedom).

The system 100 can further include a base 110 (e.g., a table) and a user interface 112. The user interface 112 can be supported by the base 110. The system 100 can include one or more actuators configured to tilt, rotate, translate, and/or otherwise move the cutting head assembly 104. For example, the system 100 can include a first actuator 114a, a second actuator 114b, and a third actuator 114c (collectively, "the actuators 114") configured to move the waterjet assembly 104 relative to the base 110 and other stationary components of the system 100, and/or to move the base 110 relative to the cutting head assembly, (such as a stationary waterjet assembly) 104. For example, the second actuator 114b can be configured to move the cutting head assembly 104 along a processing path (e.g., cutting path) in two or three dimensions and to tilt the cutting head assembly 104 relative to the base 110, or to tilt the base 110 relative to the cutting head assembly 104, or to tilt both. In some embodiments, the second actuator 114*b* tilts the cutting head assembly 104 in two or more dimensions. Thus, the cutting head assembly 104, or the base 110, or both, can be configured to direct a pressurized jet of fluid toward a workpiece (not shown) supported by the base 110 (e.g., held in a jig supported by the base 110) and to move relative to either the cutting head assembly 104 or the base 110, or both, while directing the jet toward the workpiece. In various embodiments, the system 100 can also be configured to manipulate the workpiece in translatory and/or rotatory motion, manipulating the jet and/or the workpiece.

The user interface 112 can be configured to receive input from a user and to send data based on the input to a computing device 120 (e.g., a controller). The input can include, for example, one or more specifications (e.g., coordinates, geometry or dimensions) of the processing path and/or one or more specifications (e.g., material type or thickness) of the workpiece and operating parameters (e.g., for a waterjet tool, pressure, flow rate, abrasive material, etc.).

The cutting head assembly 104 can include a cutting head 122 and a nozzle outlet 124. The cutting head 122 can be configured to receive fluid from the fluid supply assembly 102 via the conduit 106 at a pressure suitable for liquid jet (e.g., waterjet) processing. As described below with respect to FIG. 3, the cutting head 122 can include one or more components configured to condition fluid between the fluid supply assembly 102 and the nozzle outlet 124.

The system 100 can further include a consumable delivery apparatus 126 configured to feed consumables, such as particulate abrasive, from a consumables storage container 128 to the cutting head assembly 104. The system 100 can include an abrasive conduit 129 configured to convey consumables from the storage container 128 to the consumable delivery apparatus. In some embodiments, the consumable delivery apparatus 126 is configured to move with the cutting head 104 relative to the base 110, or vice versa. In other embodiments, the consumable-delivery apparatus 126 can be configured to be stationary while the cutting head assembly 104 moves relative to the base 110. The system 100 can include one or more cutting heads that can be controlled individually and can be applying same or different parameters (orifice size, mixing tube size, abrasive size, abrasive type, abrasive feed rate, etc.).

The base 110 can include a diffusing tray 130. The diffusing tray 130 can be configured to hold a pool of fluid positioned relative to the jig so as to diffuse the remaining energy of the jet from the cutting head assembly 104 after the jet passes through the workpiece.

The computing device 120 (shown schematically) can be operably connected to the user interface 112 and one or more of the actuators 114 (e.g., via one or more cables, wireless connections, etc.). In some embodiments, the computing device 120 is also operably connected to a consumable metering device 132 (shown schematically) of the consumable delivery apparatus 126. In other embodiments, the consumable delivery apparatus 126 can be without the metering device 132 or the metering device 132 can be configured for use without being operably associated with the computing device 120. The metered consumables can be but are not limited to sand, abrasive garnet, or other appropriate abrasive materials or combinations of materials.

The computing device 120 can include a processor 134 and memory 136 and can be programmed with instructions (e.g., non-transitory instructions contained on a computer-readable medium) that, when executed, control operation of the liquid jet cutting system 100.

The system can be configured to contain one or more independent or connected motion control units. The system can be configured in various ways that allow perpendicular, rotational and/or angular cutting of workpieces of different shape. Embodiments of the system can include but are not limited to gantry, bridge, multi-axis kinematics (similar in function to OMAX Tilt-A-Jet or A-Jet tools and Hypertherm Echion and HyPrecision systems), 6-axis robot, rotary, and hexapod style machines. In various embodiments, the system is suited to cutting workpieces of a wide variety of thicknesses, including workpieces of negligible thicknesses. In various embodiments, the system 100 is adapted to cut workpieces of a variety of three-dimensional shapes. In some embodiments, the jet can cut at any angle relative to the workpiece.

Figure 2:
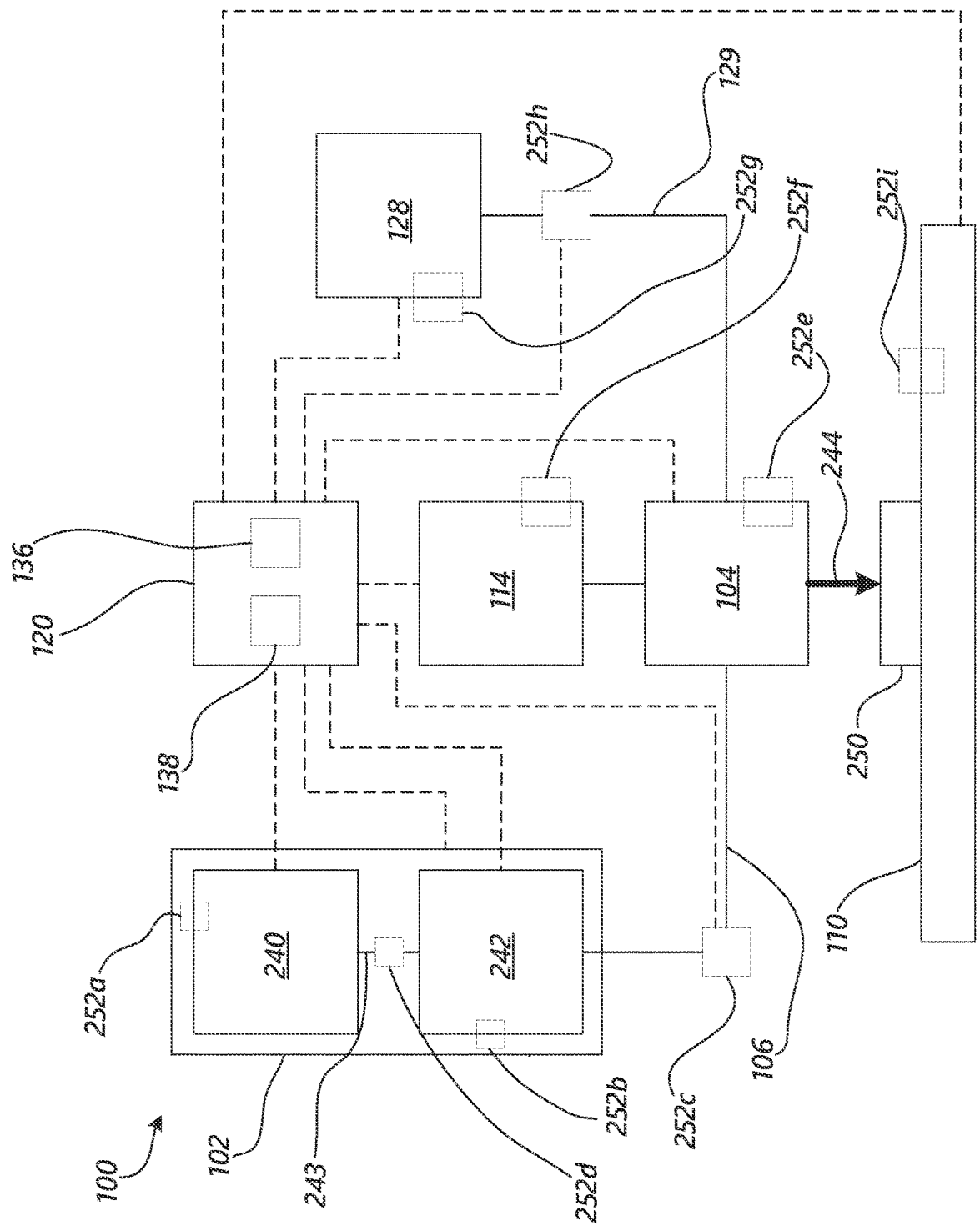
FIG. 2 is a schematic illustration of a liquid jet cutting system having one or more sensors, configured in accordance with embodiments of the present technology.

FIG. 2 is a schematic illustration of the liquid jet cutting system 100, configured in accordance with embodiments of the present technology. As explained above with respect to FIG. 1, the system 100 includes a fluid supply assembly 102 configured to provide pressurized fluid to the cutting head assembly 104 via one or more conduits 106. The fluid supply assembly 102 can include a fluid source 240, such as, for example, a fluid tank, a utility water line, or some other source of fluid. The fluid supply assembly 102 can further include one or more pressurization devices 242 in fluid communication with the fluid source 240 (e.g., via one or more fluid conduits 243), and configured to pressurize fluid from the fluid source 240. The pressurization device(s) 242 can include one or more pumps, intensifiers, accumulators, and/or other devices configured to pressurize fluid for use with the cutting head assembly 104.

The cutting head assembly 104 can be configured to receive pressurized fluid (e.g., water) from the pressurization devices 242. The cutting head assembly 104 can also receive abrasive material from the consumable storage container 128. In some embodiments, the system 100 includes one or more valves between the consumable storage container 128 and the cutting head assembly 104 to meter flow of consumable material to the cutting head assembly 104. The cutting head assembly 104 can be configured to emit a jet 244 toward a workpiece 250 to cut or otherwise remove material from the workpiece 250. The workpiece 250 can be secured to the base 110 (e.g., a table) using one or more jigs or other securement devices.

One or more of the assemblies, components, and/or subcomponents of the fluid jet cutting system 100 can include one or more sensors (collectively, "252") configured to monitor characteristics of the fluid jet cutting system 100. While FIG. 2 illustrates a single sensor corresponding to each illustrated component (e.g., a first sensor 252*a* corresponding to the fluid source 240, a second sensor 252*b* corresponding to the pressurization device(s), a third sensor 252*c* corresponding to the conduit 106 between the fluid supply assembly 102 and the cutting head assembly 104, etc.), one or more of the components may include more than one sensor.

The sensors 252 can be, for example, accelerometers or other motion sensors, microphones or other audio sensors, thermistors or other temperature sensors, optical sensors, pressure sensors, electrostatic sensors, continuity sensors, micro-electromechanical systems (MEMS), glass-break sensors, and/or impact switches. As described herein, accelerometers or other motion sensors can be configured to monitor orientation, scalar movement, vibration, translation, rotation, and/or tilting of a component of the liquid jet cutting system 100. In some embodiments, the fluid jet cutting system 100 includes multiple sensors 252, each of which are operably connected to or otherwise configured to monitor separate components of the fluid jet cutting system 100. In some embodiments, one or more components of the fluid jet cutting system 100 include more than one sensor configured to monitor characteristics of that single component. For example, two or more of an accelerometer, temperature sensor, audio sensor, and/or other sensor can be operably connected to and/or configured to monitor characteristics of the cutting head assembly 104 or subcomponents thereof.

The sensors 252 can be physically connected to, embedded at least partially within, or otherwise operably coupled with various components of the fluid jet cutting system 100. For example, one or more sensors 252c can be connected to the conduit 106 between the fluid supply assembly 102 and the cutting head assembly 104. The one or more sensors 252c can be positioned inside of the conduit 106, in a wall of the conduit 106, and/or on an exterior of the conduit 106. In some embodiments, a sensor 252c can be positioned near, but not directly connected to, the conduit 106 to monitor a characteristic of the conduit 106. For example, an audio sensor may be best positioned near but not in contact with the conduit 106 in order to monitor sound generated by the conduit 106 during operation of the fluid jet cutting system 100. Sensors 252 can be similarly distributed with one or more of the other components, assemblies, and subsystems of the fluid jet cutting system 100, as illustrated in FIG. 2. For example, as described below with respect to FIG. 3, one or more sensors 252e may be associated with the cutting head assembly 104. In some embodiments, one or more sensors 252 are integrated in electrical cable systems of the liquid cutting system 100. For example, one or more sensors can be integrated into cable heads or other structures of the electrical cable system.

The one or more sensors 252 can be removable attached (e.g., via magnets, clips, clamps, etc.) or fixedly attached to the components of the fluid jet cutting system 100. In some embodiments, different types of sensors are swappable with respect to the same component. For example, a first type of sensor 252 may be coupled to a component during a first operation, and then removed and replaced with a second type of sensor for a subsequent operation. In some configurations, two or more sensors 252 can share a coupling or mounting structure.

The sensors 252 can be operably connected to the computing device 120 via wired or wireless connections and can be configured to generate sensor data in response to monitoring characteristics (e.g., performance characteristics) of one or more components of the fluid jet cutting system 100. For example, one of the sensors 252 can be an accelerometer connected to a component of the liquid jet cutting system 100. The accelerometer can detect movement (i.e., vibration, rotation, translation, tilting, etc.) of the component with which the accelerometer is associated. This movement data can be collected from the accelerometer by the computing device 120 and can be stored in the memory 136 of the computing device. In some embodiments, a second sensor 252 can be used to monitor a second characteristic of a component of the fluid jet cutting system 100. The component monitored by the second sensor 252 can be the same component monitored by the first sensor 252, or another component of the fluid jet cutting system 100. The second sensor 252 can be either a same type of sensor as the first sensor 252 or a different sensor type. For example, a microphone or other audio sensor can be used in combination with an accelerometer. Audio data generated by the audio sensor can be collected by the computing device 120 and, in some embodiments, stored in the memory 136 thereof. As explained in more detail below, data generated by multiple sensors 252 can be correlated by the computing device 120 (e.g., using a processor 138 thereof) to diagnose the performance characteristic of the component being monitored.

Figure 3:
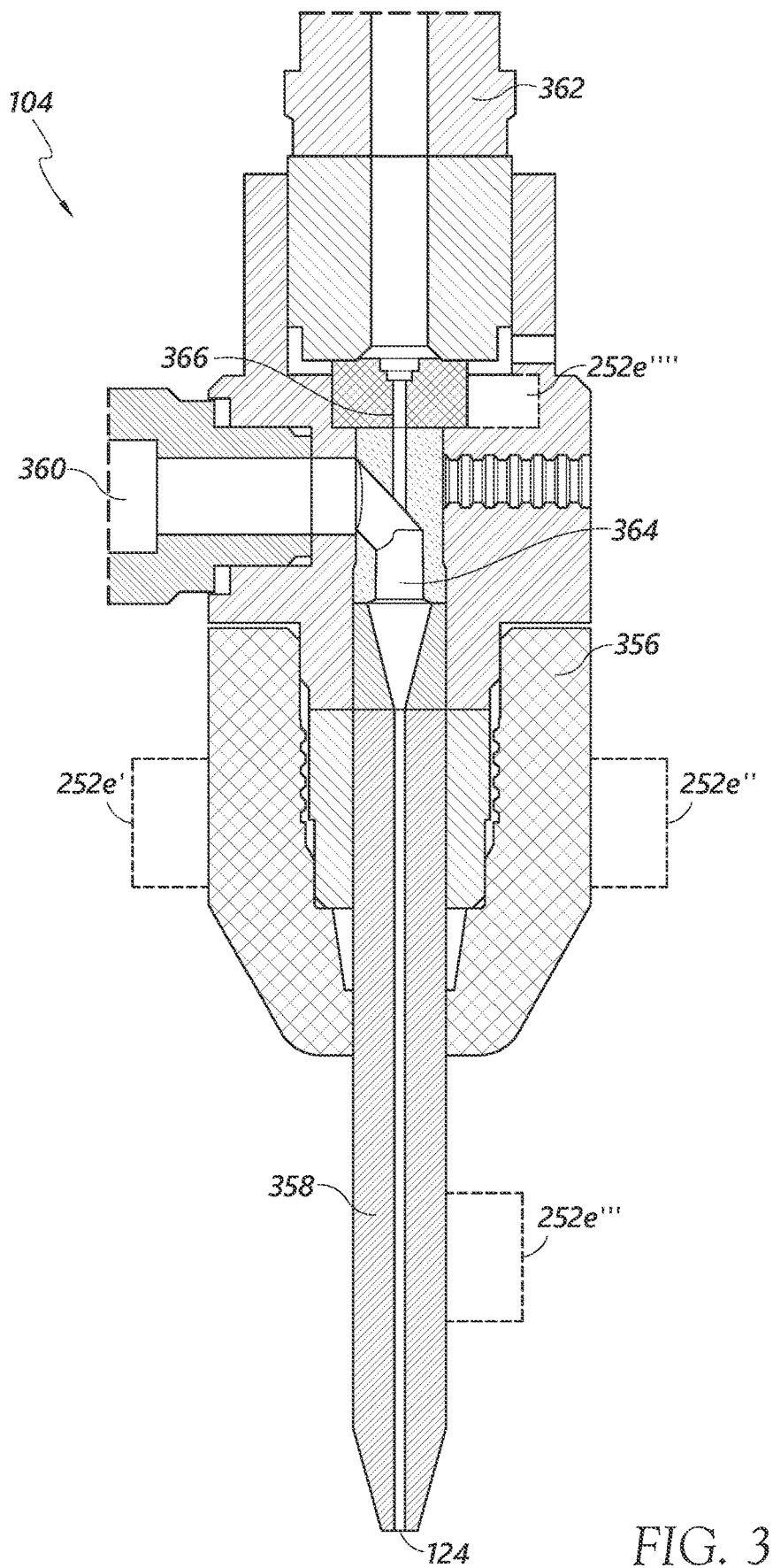
FIG. 3 is a cross-sectional view of a cutting head assembly having one or more sensors, configured in accordance with embodiments of the present technology.

FIG. 3 is a cross-sectional view of the cutting head assembly 104, configured in accordance with embodiments of the present technology. The cutting head assembly 104 can include a cutting head body 356, a nozzle 358 connected to the cutting head body 356, an abrasive inlet 360, and a fluid inlet 362. The nozzle 358 can be positioned at least partially within the cutting head body 356 and can include the nozzle outlet 124. The abrasive inlet 360 can be configured to receive abrasive material from the consumables storage container 128 (e.g., via the abrasive conduit 129). In some embodiments, the abrasive inlet 360 is in a lateral side of the cutting head body 356 with respect to a longitudinal axis of the nozzle 358. The fluid inlet 362 can be configured to receive pressurized fluid from a fluid supply assembly 102. In some embodiments, the cutting head body 356, abrasive inlet 360, and/or fluid inlet 362 include valves configured to control flow of fluid and/or abrasive material to the nozzle 358.

In some embodiments, high-pressure fluid from the fluid inlet 362 entrains abrasive material from the abrasive inlet 362 into a mixing chamber 364 within the cutting head body 356. The resulting mixed abrasive and fluid is then passed through the nozzle 358 and emitted as a high-pressure jet from the nozzle outlet 124. In some embodiments, the cutting head assembly 104 is configured to operate without abrasive material. One or more flow conditioners can be positioned within the flow paths of the fluid, abrasive, and/or mixed fluid in abrasive within the cutting head body 356. For example, the cutting assembly 104 can include an orifice 366 in the flow path between the fluid inlet 362 in the mixing chamber 364. The orifice 366 can be formed as part of the cutting head body 356 or in a separate component configured to couple with the cutting head body 356. The orifice 366 can be configured to accelerate (e.g., form a jet of) fluid upstream of the mixing chamber 364.

As illustrated in FIG. 3, one or more sensors (collectively, "sensors 252e") can be positioned on or in the cutting head assembly 104. The sensors 252e can be configured to monitor various performance characteristics of the cutting head assembly 104 and/or subcomponents thereof. For example, a first sensor 252e' can be connected to the cutting head body 356 (e.g., via a magnetic, adhesive, or other mounting structure). The first sensor 252e' can be, for example, an accelerometer configured to monitor movement of the cutting head body 356. A second sensor 252e" may also be connected to the cutting head body 356. The second sensor 252e" can be, for example, a microphone or other audio sensor configured to monitor noise generated by the cutting head assembly 104 or some subcomponent thereof. Data from each of the sensors 252e can be relayed to the computing device 120 as described above.

In some embodiments, additional sensors can be associated with the cutting head assembly 104. For example, a third sensor 252e''' can be connected to the nozzle 358 to monitor performance characteristics thereof. The third sensor 252e''' could be an accelerometer, a microphone, a temperature sensor, or some other sensor configured to monitor a performance characteristic of the nozzle 358. In some embodiments, the third sensor 252e''' is an impact sensor configured to detect contact between the nozzle 358 and a workpiece 150. For example, in order to calibrate a distance between the nozzle 358 and the workpiece 150, the actuators 114 can bring the nozzle 358 into contact with the workpiece 150 (e.g., tapping the workpiece 150 with the nozzle 358). Determining the precise location of the nozzle 358 with respect to the workpiece 150 can reduce the likelihood of inadvertent impact between the nozzle 358 and the workpiece 150 during operation of liquid jet cutting system 100.

The cutting head assembly 104 can include one or more sensors installed inside of, or at least partially inside of the cutting head body 356 or some other subcomponent of the cutting head assembly 104. For example, a fourth sensor 252e'''' may be positioned within the cutting head body 356 at or near the orifice 366 to monitor performance characteristics of the orifice 366. In some embodiments, the fourth sensor 252e'''' can be mounted on a circuit board within the cutting head body 356. It will be understood that the cutting assembly 104 of the liquid jet cutting system 100 can include one or more, or none, of the above described sensors 252e.

Figure 4A:
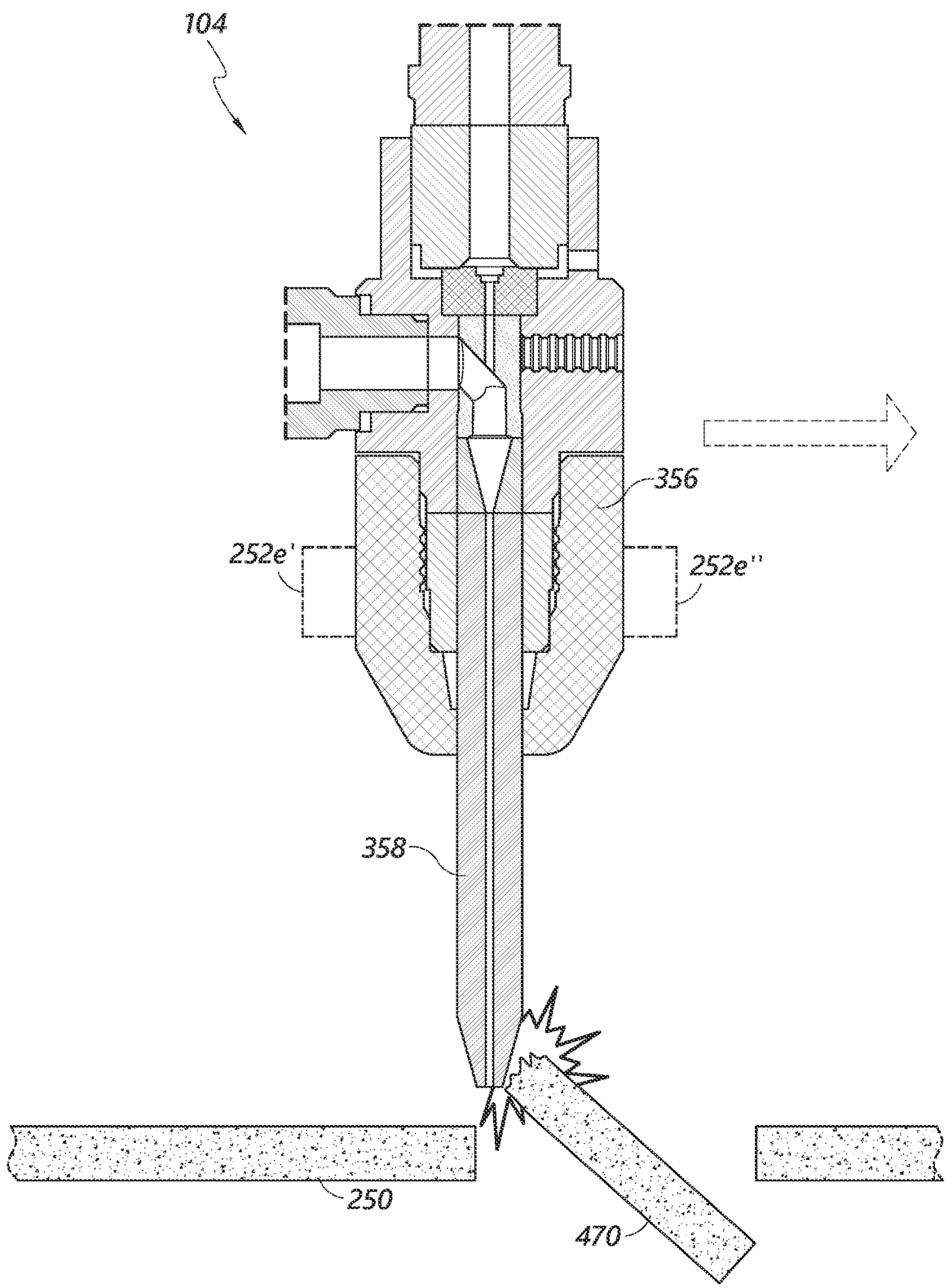
FIG. 4A is a cross-sectional view of the cutting head assembly of FIG. 3 impacting the portion of a workpiece.
Figure 4B:
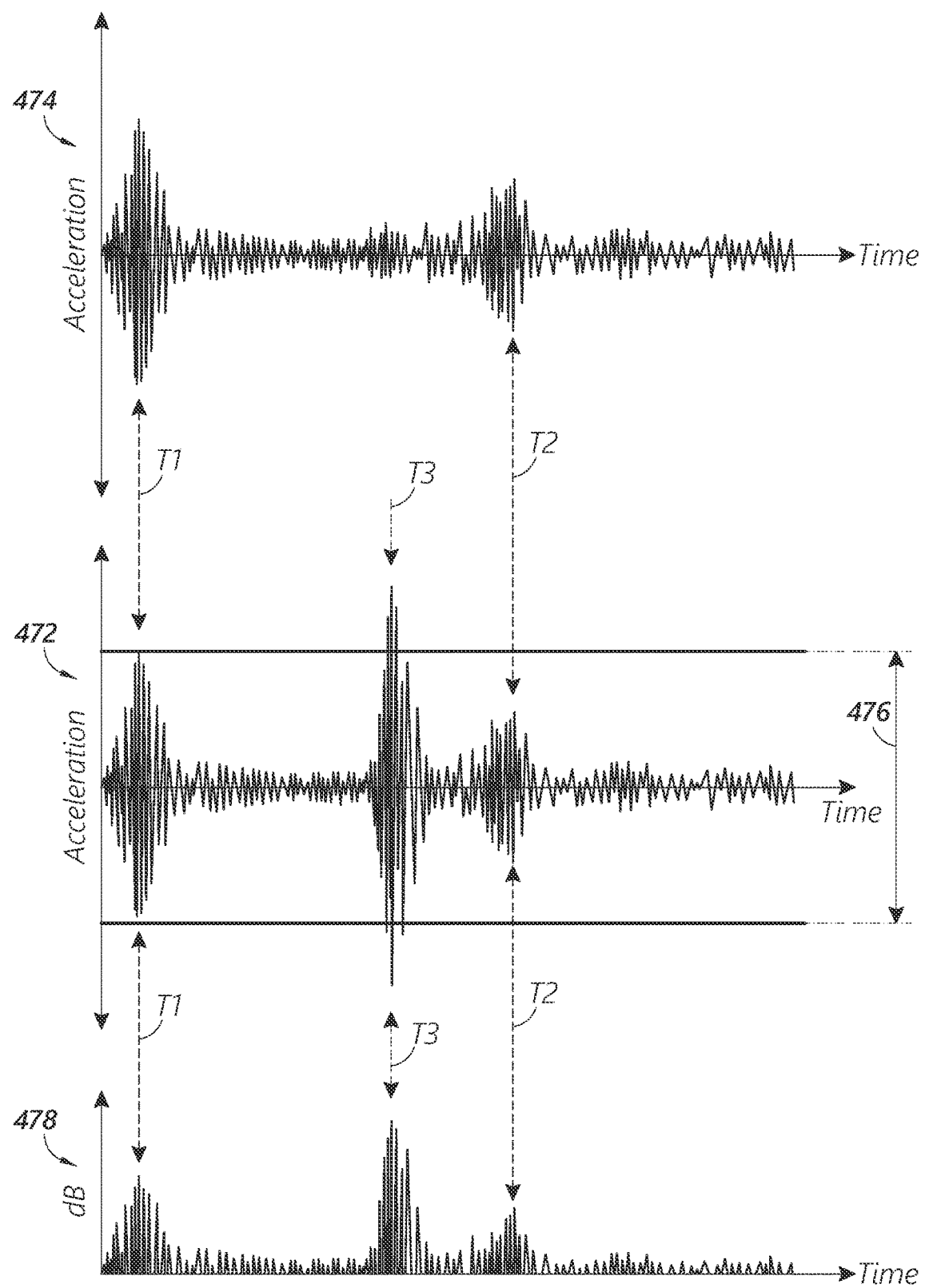
FIG. 4B illustrates data associated with detected motion, planned motion, and noise associated with the cutting head assembly of FIG. 4A.

FIGS. 4A and 4B illustrate a scenario in which sensors can be used to diagnose a failure in the liquid jet cutting system 100. Referring to FIG. 4A, in some cutting operations, once a part 470 is fully cut out of the workpiece 250, that part 470 can tip up between slats on the base 110 (e.g., table), leaving a raised obstacle in the movement path of the nozzle 358 or other component of the cutting head assembly 104. Alternatively, a portion of the workpiece 250 can break, warp, or otherwise displace into the movement path of the nozzle 358 or other component of the cutting head assembly 104. In the illustrated example, a tipped-up part 470 of the workpiece 250 is angled up toward the cutting head assembly 104 and blocks movement of the nozzle 358 as the cutting head assembly 104 moves along a cut path. The nozzle 358 can impact the tipped-up part 470 of the workpiece 250. This impact could have various negative effects on the liquid jet cutting system 100. For example, if the cutting head assembly 104 were to continue along the cut path, the nozzle 358, cutting head body 356, or some other portion of the liquid jet cutting assembly 100 (e.g., an actuator 114) could be damaged. To avoid such damage, it is desirable that the cutting head assembly 104 stop moving and/or stop cutting upon impact with the tipped-up part 470 of the workpiece 250.

FIG. 4B illustrates example data that may be monitored and collected by the sensors 252e of FIG. 4A. For example, the first sensor 252e' can be an accelerometer or other motion sensor. Movement data collected by the first sensor 252e' can be plotted as acceleration over time, as reflected in the data set charted in the movement chart 472.

The computing device 120 can be configured to correlate the movement data collected from the first sensor 252e' with planned data associated with the dictated cut path associated with the specific project and/or with normal operation of the liquid jet cutting system 100. For example, sensors 252e can be used in supervised jobs to generate data associated with normal operation of the liquid jet cutting system 100. Using the sensors 252e during supervised operation of the liquid jet cutting system 100 can generate baseline or planned data associated with performance characteristics of the liquid jet cutting system 100. The chart 474 of FIG. 4B illustrates a planned data set associated with movement of the cutting assembly 104 during normal operation. The first local maximum of the acceleration data can be at a time T1 associated with initiating a cut using the cutting head assembly 104 (e.g., starting the liquid jet). The second local maximum the acceleration data at a time T2 can be associated with shutting off the jet of the cutting assembly 104. In some embodiments, the computing device 120 can define a planned maximum acceleration 476 (chart 472) associated with normal operation of the liquid jet cutting system 100. In the illustrated example, the planned maximum acceleration 476 can be equal to or approximately equal to (e.g., within +/−5%) of the local maximum associated with initiating a cut.

Referring to the movement data reflected in the movement chart 472, a local maximum associated with impact between the nozzle 358 and the broken portion 470 of the workpiece 250 is shown at time T3. As illustrated, the magnitude of the acceleration associated with impact between the nozzle 358 and the broken portion 470 of the workpiece 250 is greater than the planned maximum acceleration 476. As explained in more detail below, the computing device 120 can be configured to generate an alarm signal and/or shut off the cutting head assembly 104 upon detection of acceleration greater than the planned maximum acceleration 476.

In some embodiments, the second sensor 252e'' can be a microphone or other audio sensor configured to monitor sound produced by the cutting head assembly 104 during operation of the liquid jet cutting system 100. sound data generated by the microphone (chart 478 of FIG. 4B) can be received by the computing device 120 and correlated to the movement data collected by the first sensor 252e' and/or to the planned data. For example, the computing device 120 can further verify the occurrence of a failure by correlating local maxima of the noise data with local maxima of the movement data. I.e., in the event that a high magnitude acceleration occurs at or near the same time that a loud sound occurs, this correlation between acceleration and sound can increase confidence that a failure (e.g. impact between two parts) has occurred. Increasing the confidence that an actual failure is detected can reduce the likelihood that the liquid jet cutting assembly 100 is shut down for a non-failure. Such unnecessary shutdowns can greatly impact work rate of the liquid jet cutting system and can have an adverse impact on the quality of the cuts made by the liquid jet cutting system. It will be understood that other types of sensor data (e.g., temperature, pressure, etc.) can be observed and correlated to other sensor data collected by sensors 252e.

Figure 5A:
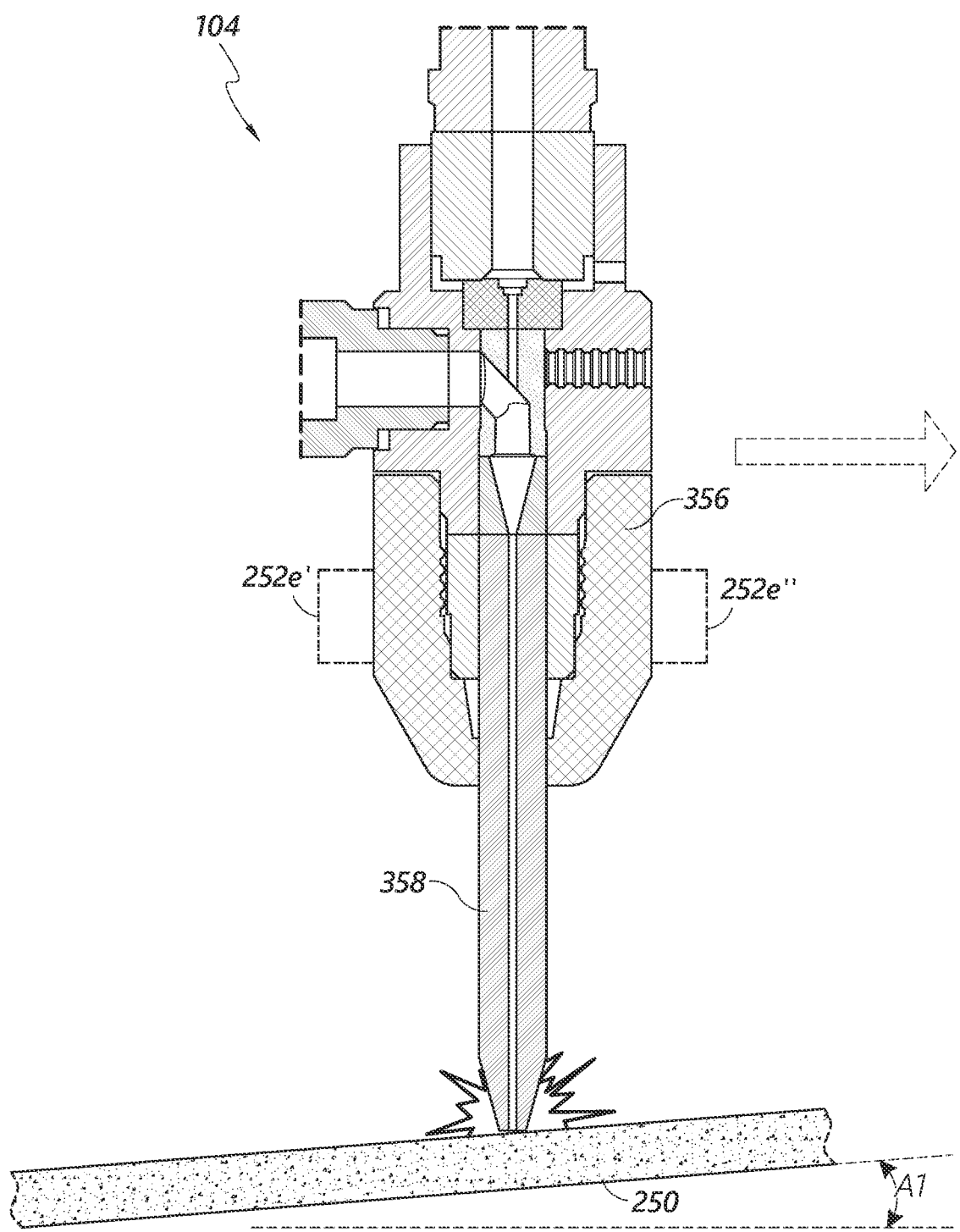
FIG. 5A is a cross-sectional view of the cutting and assembly of FIG. 3 scraping along a portion of a workpiece.
Figure 5B:
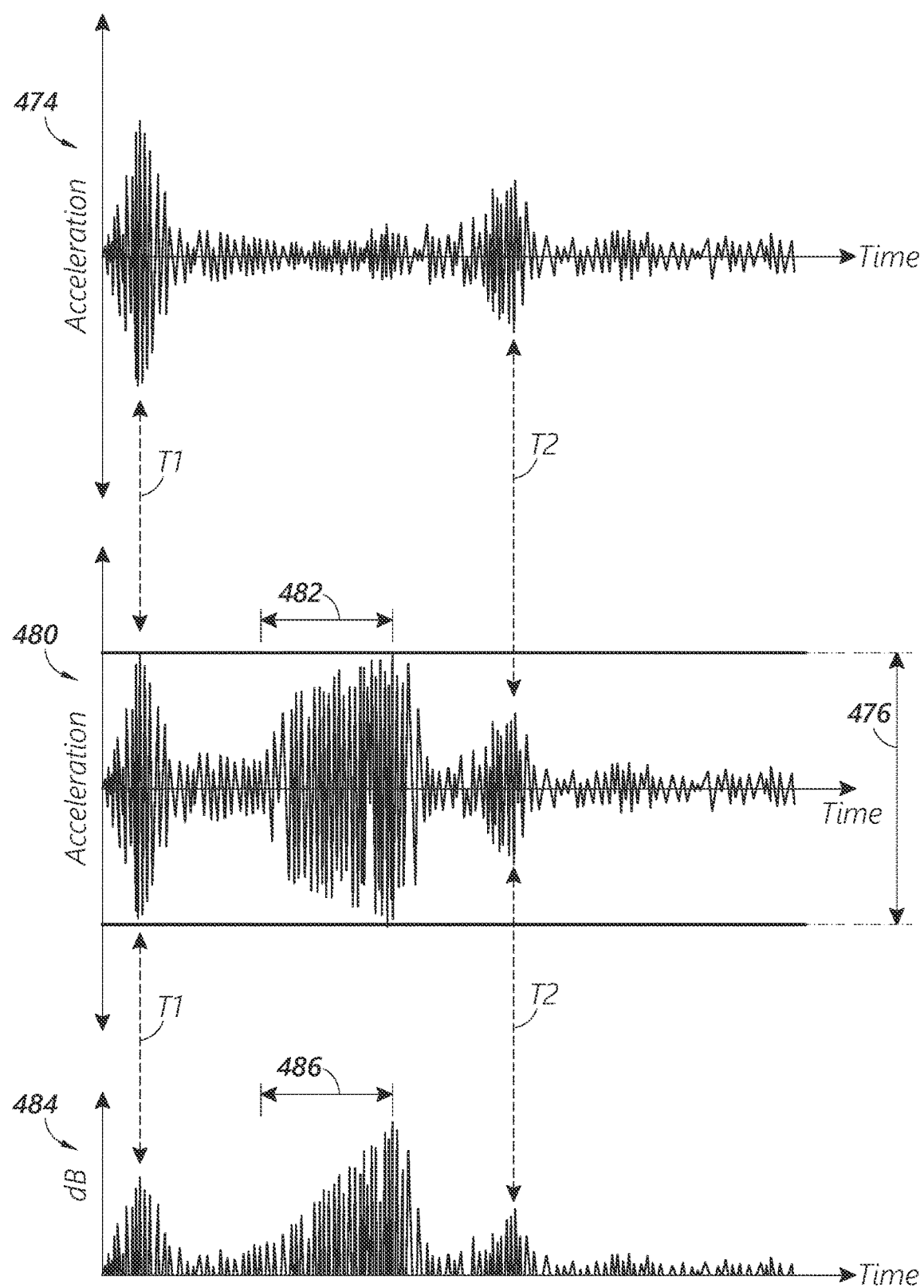
FIG. 5B illustrates data associated with detected motion, planned motion, and noise associated with the cutting head assembly of FIG. 5A.

FIGS. 5A-5B illustrate another scenario in which sensors can be used to diagnose a failure in the liquid jet cutting system 100. Referring to FIG. 5A, in some operations, the workpiece 250 can be warped, tilted, or otherwise misaligned such that the vertical position of the workpiece 250 (e.g., as measured vertically in the frame of reference of FIG. 5A and/or in a direction parallel to the longitudinal axis of the nozzle 358) is tilted upward and/or toward the cutting and assembly 104. Such tilting or misalignment may be added relatively small angle A1. For example, the angle A1 between a top surface of the workpiece 250 and horizontal may be as low as about 1°, about 5°, about 10°, and/or about 30° or less. Rather than a hard or jolting impact, contact between the nozzle 358 in such a tilted workpiece 250 can result in gradual scraping, increase friction, and/or resistance to movement of the cutting head assembly 104 along the cut path.

The scraping between the nozzle 358 and the workpiece 250 can be reflected in motion data generated by the first sensor 252' (e.g., an accelerometer). Rather than a large spike in acceleration associated with a hard impact between the nozzle 358 in the workpiece 250, the motion data may reflect a gradual increase in acceleration corresponding to scraping of the nozzle 358 along the workpiece 250. The magnitude of this increased acceleration may not, in some situations, exceed the plan max acceleration 476. In some such scenarios, the computing device 120 can correlate a range 482 of increased acceleration (e.g., as compared to the planned motion data) associated with the scraping with the plan motion data. The computing device 120 can be configured to generate an alarm signal and/or shut down the liquid jet cutting system 100 if sustained elevated acceleration is detected (e.g., elevated acceleration over an extended or predetermined period of time). For example, increased acceleration over a time range greater than 0.1 seconds, 0.3 seconds, one second, two seconds, five seconds, 10 seconds, and/or 30 seconds can be used by the computing device 120 to shut down the liquid jet cutting system 100.

In some embodiments, data from a second sensor 252e" can be used in addition to or instead of the planned data. For example, the second sensor 252e" can be a microphone configured to monitor noise output from the cutting head assembly 104. In the above-described scraping scenario of FIG. 5A, sound magnitude detected by the microphone can resemble the sound values charted in chart 484 of FIG. 5B. Specifically, the sound values may increase over a time range 486. The computing device 120, in this scenario, can correlate the time range 482 of increased acceleration detected by the accelerometer with the time range 486 of increased sound detected by the microphone. Concurrence of the ranges 482, 486 with each other can increase the confidence that a failure is occurring and reduce the risk that the computing device 120 shuts down the liquid jet cutting system 100 in reaction to a false positive detection of failure.

It will be understood that sensor data other than motion can be used to establish planned data as described above with respect to the planned maximum acceleration. For example, noise or temperature can be measured by one or more sensors during normal operation. This data can be used to established planned noise/temperature data, against which later-gathered data can be compared and correlated in a manner similar to or the same as that described above with respect to FIGS. 4A-5B.

In some embodiments, sensor data obtained at the beginning of an operation can be compared with data from the same sensor at the end of the operation to determine whether one or more components have experienced wear during the operation of the liquid jet cutting system 100. For example, accelerometer data of a first operational state (e.g., powered on without cutting or movement of the cutting head assembly 104) at a beginning of the cutting operation can be compared to accelerometer data of that same operational state at the end of the cutting operation. Some such comparisons can be made automatically by the computing device 120. For example, if higher acceleration values are observed at the end of the cutting operation, the computing device 120 can be configured to alert the user of potential wear to one or more components of liquid jet cutting assembly 100.

In addition to detecting potential failures and wear during the operation of the liquid jet cutting system 100, the sensors 252 and computing device 120 can be used to determine whether planned cuts are completed during operation of the liquid jet cutting system 100. For example, specific performance characteristics associated with the cutting head assembly 104 or subcomponent thereof indicate that the jet emitted from the nozzle 358 has pierced or otherwise cut through a workpiece 150. Such performance indicators can include, for example, a momentary spike in acceleration data from an accelerometer and/or a change in volume and/or pitch of sound produced during operation of the cutting head assembly 104. Accelerometers and/or microphones can be used during normal operation to establish baseline performance indicators indicative of piercing or cutting through workpieces. The computing device 120 can compare performance characteristics as measured by one or more sensors during a specific operation with planned or expected performance characteristics to determine whether desired piercing or through cutting is achieved. On the other hand, the computing device 120 can also determine whether an undesired piercing or through cut has occurred. In either situation, the computing device 120 can be configured to generate an alarm signal and/or shut off the jet if undesired piercing or lack of piercing occurs.

In some configuration, anomalies detected by a microphone or other audio sensor can be indicative of a clog of abrasive material a portion of the fluid jet cutting system 100. For example, abrasive material may clog in the mixing chamber 364 of the cutting and assembly 104, in the abrasive conduit 129, in the nozzle 358, or elsewhere in the liquid jet cutting system 100. Such clogs can result in increased vibration within the system 100, acceleration of fluid through the system 100, change in sound profile of the jet 244, and/or in other phenomena that would change sounds generated by one or more components of the liquid jet cutting system 100. The ON/OFF state of the consumable delivery system 126 may be monitored using an accelerometer and/or a microphone. For example, the computing device 120 can be configured to alert the user of the liquid jet cutting system 100 if the expected sound and/or vibration characteristics associated with operation of the consumable delivery system 126 are absent from the data generated by the one or more sensors of the liquid jet cutting system 100. Similarly, orifice failures (e.g. cracks or other damage to an orifice) can result in abnormal or anomalous sound emitting from one or more components of the liquid jet cutting system 100. In some embodiments, the computing device 120 is configured to alert a user of the liquid jet cutting system 100 to the possibility of a clog or other failure upon detection, by an audio sensor, of anomalous sound from the liquid jet cutting system 100 or subcomponent thereof.

In order to improve accuracy and reliability of the operational monitoring system, the computing device 120 can be configured to filter ambient noise, ambient vibration, and other environmental factors from the signals received from the one or more sensors. For example, adjacent machinery, seismic activity, altitude, humidity, and other environmental factors can affect the signals generated by the one or more sensors. These environmental factors may be filtered out of the signals by generating data using the one or more sensors while the fluid jet cutting system 100 shut off. Filtering out environmental factors can reduce the likelihood of false positive indications of failure or where in the fluid jet cutting system 100. For example, filtering out environmental factors reduces the likelihood that elevated sound levels or vibration levels from the surrounding environment are mistaken for deterioration in the performance of the fluid jet cutting system 100.

In some embodiments, the operational monitoring system is configured to filter out baseline operational characteristics of the liquid jet cutting system 100. For example, one or more sensors can be used to monitor performance characteristics of the liquid jet cutting system 100 in various states of operation. The states operation can include power on without activating the cutting head assembly 104, power on without moving components of the liquid jet cutting system 100, movement of the cutting head assembly 104 and/or other components without activating the nozzle 358 of the cutting and assembly 104, and/or other operation states. Collecting data at the various states of operation can reduce the likelihood that normal operating parameters are mistaken for failures or other anomalies.

The computing device 120 can be configured to monitor acceleration data from one or more accelerometers in the liquid jet cutting system 100 and determine whether the acceleration data indicates that one or more components are vibrating at a resonant frequency. Resonant frequency values for the one or more components may be stored in the memory 136 of the computing device 120. The computing device can be configured to generate an alarm signal and/or shut down the liquid jet cutting system 100 if resonant frequencies are detected. Such alarms and/or shut-downs can reduce the likelihood of damage to components of the liquid jet cutting system 100 due to wear imposed by vibrations at resonant frequency of those components.

In some embodiments, the planned data associated with a specific cutting operation can include orientation data of the cutting head assembly 104, nozzle 358, or the components of the liquid jet cutting system 100. One or more accelerometers or other motion sensors may be used to monitor orientation of the cutting head assembly 104 during a cutting operation in the monitored orientation data produced by such sensors can be compared to the planned data. Differences in orientation between the monitored orientation data in the planned data can indicate deviation of the cutting assembly 104 from the planned cut path. The computing device 120 can be configured to detect such deviations generate alarm signals and/or shut down the liquid jet cutting system 100 when and if such orientation deviations are detected.

Figure 6:
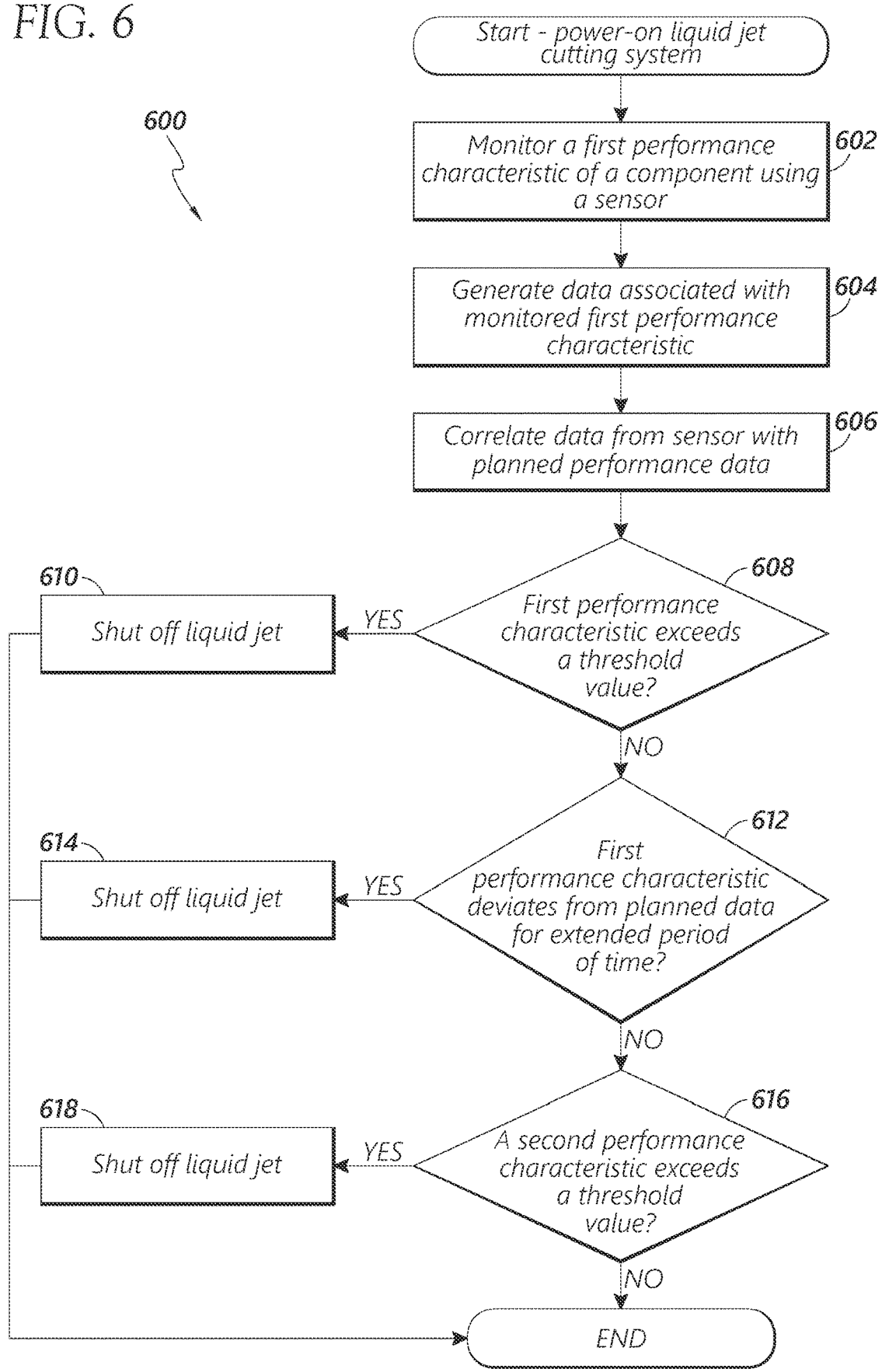
FIG. 6 is a flow diagram of a routine for monitoring operation of a liquid jet cutting system, in accordance with some embodiments of the present technology.

FIG. 6 is a flow diagram of a routine 600 for monitoring performance of the liquid jet cutting system 100 described in detail above with reference to FIGS. 1-5B, in accordance with an embodiment of the present technology. All or portions of the routine 600 can be performed by the computing device 120 in accordance with computer-readable instructions stored on, e.g., the memory 136. Although the routine 600 is described below in reference to the liquid jet cutting system 100 described above with reference to FIGS. 1-5B, it will be appreciated that the routine 600 and/or various portions thereof can be performed with other liquid jet cutting systems having configured in accordance with the present disclosure.

The routine 600 begins by powering on the liquid jet cutting system (e.g., the liquid jet cutting system 100 described above). The routine then proceeds to block 602, wherein one or more sensors are used to monitor a first performance characteristic of a component of the liquid jet cutting system. For example, as described above, an accelerometer can be used to monitor movement of the cutting head assembly of the liquid jet cutting system. The first performance characteristic can be something other than movement, such as temperature, noise, pressure, or another characteristic. In some embodiments, more than one sensor is used to monitor the first performance characteristic of a component of the liquid jet cutting system.

The routine 600 can proceed to block 604 wherein data associated with the first performance characteristic is generated by one or more sensors. In some embodiments, the data is displayed to a user. For example, the data can be displayed as a graph or chart similar to those described above with respect to FIGS. 4B and 5B. In some embodiments, the data associated with the first performance characteristic is not displayed to the user. The data can be sent to a computing device (e.g., the computing device 120 described above).

The routine 600 then proceeds to block 606, wherein the computing device correlates the data generated by the one or more sensors with planned data gathered during previous operation of the liquid jet cutting system. For example, the planned data can be data gathered during analogous operations at known, normal (e.g., without fault) operating conditions and stored in a memory of the computing device.

Correlating the first performance characteristic data with the planned data can include confirming whether the monitored first performance characteristic data exceeds or otherwise deviates from the planned data. For example, the computing device can determine whether magnitude of an acceleration monitored by an accelerometer exceeds a maximum planned acceleration associated with the present operation of the liquid jet cutting system. In some embodiments, correlating first performance characteristic data with the planned data can include determining whether monitored first performance characteristics exceeds expected planned data characteristics over a predetermined period of time.

Moving to decision block 608, the computing device can determine whether the first performance characteristic exceeds a predetermined threshold value for that performance characteristic. For example, the computing device can determine whether acceleration levels, sound levels, temperature values, pressure values, and/or other performance characteristics are greater than correlating predetermined maximum values. If the measured values exceed the threshold values, the computing device can be configured to shut off the liquid jet, as indicated in block 610.

If the measured first performance characteristic does not exceed the corresponding threshold value, the computing device can determine whether the first performance characteristic deviates from the planned data for an extended or otherwise predetermined period of time, as indicated in decision block 612. If the computing device determines that the first performance characteristic deviates from the planned data for an extended or otherwise predetermined period of time, the computing device can be configured to shut off the liquid jet, as indicated in block 614.

Finally, if the first performance characteristic does not deviate from the planned data for an extended or otherwise predetermined period of time, the routine 600 can proceed to decision block 616, wherein the computing device determines whether a second performance characteristic exceeds a threshold value. The second performance characteristic can be different from the first performance characteristic. For example, if the first performance characteristic is the movement of a component of the liquid jet cutting system, the second performance characteristic could be sound levels, pressure levels, and/or temperature of that component. In some embodiments, the second performance characteristic is of the same type as the first performance characteristic, but measured at a different location or with respect to a different component of the liquid jet cutting system. The computing device determines that the second performance characteristic exceeds a threshold value, the computing device can be configured to shut off the liquid jet system, as indicated in block 618.

In some embodiments, before shutting off the liquid jet, the computing device is configured to generate an alarm. The alarm can be an audible alarm, a visual alarm, or some other alarm used to alert a user of the liquid jet cutting system to the likelihood of a failure in the liquid jet cutting system. In some such routines, the user can be given a predetermined amount of time in which to decide whether to shut off the liquid jet cutting system or allow operation to continue.

Figure 7:
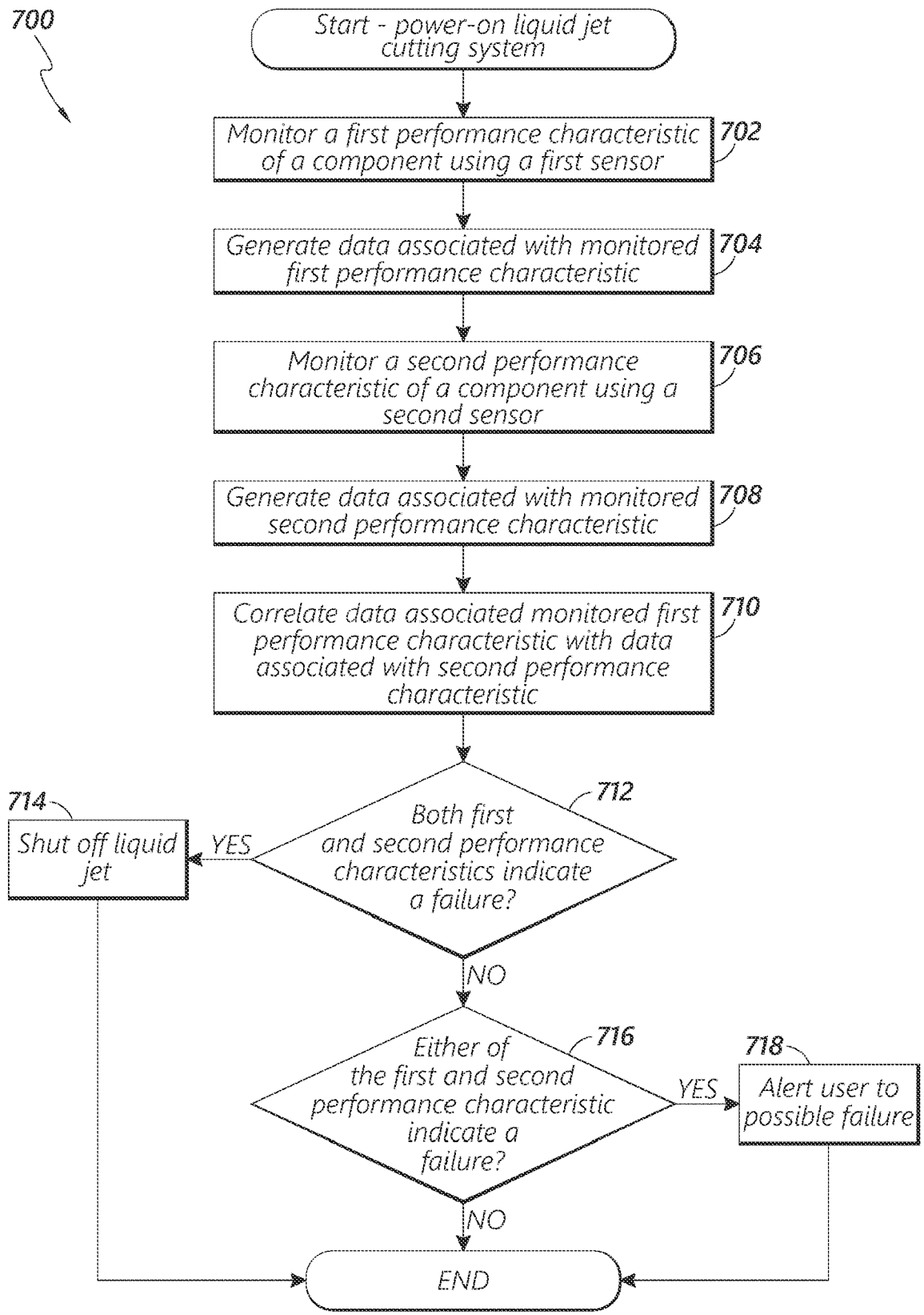
FIG. 7 is a flow diagram of another routine for monitoring operation of a liquid jet cutting system, in accordance with some embodiments of the present technology.

FIG. 7 is a flow diagram of a routine 700 for monitoring performance of the liquid jet cutting system 100 described in detail above with reference to FIGS. 1-5B, in accordance with an embodiment of the present technology. All or portions of the routine 700 can be performed by the computing device 120 in accordance with computer-readable instructions stored on, e.g., the memory 136. Although the routine 700 is described below in reference to the liquid jet cutting system 100 described above with reference to FIGS. 1-5B, it will be appreciated that the routine 700 and/or various portions thereof can be performed with other liquid jet cutting systems having configured in accordance with the present disclosure.

The routine 700 begins by powering on the liquid jet cutting system (e.g., the liquid jet cutting system 100 described above). The routine 700 then proceeds to block 702, wherein a first sensor is used to monitor a first performance characteristic of a component of the liquid jet cutting system. For example, as described above, an accelerometer can be used to monitor movement of the cutting head assembly of the liquid jet cutting system. The first sensor can generate data associated with the monitored first performance characteristic, as indicated in block 704. This data can be sent to a computing device or another component of the liquid jet cutting system.

The routine 700 can proceed to block 706, wherein a second sensor is used to monitor a second performance characteristic of a component of the liquid jet cutting system. In some embodiments, the second sensor is of a different type from the first sensor. For example, the second sensor can be a microphone or other audio sensor, a thermistor other temperature sensor, a pressure sensor, or some other sensor used to monitor a second characteristic of the component. In some embodiments, the second sensor monitors a second performance characteristic of a second component separate from the component monitored by the first sensor. As described above with respect to FIGS. 4B and 5B, the second sensor can be a microphone configured to monitor sound generated by the cutting head assembly. As indicated in block 708 the second sensor can generate data associated with the monitored second performance characteristic. This data can be sent to the computing device or to another component of the liquid jet cutting system.

Data from the first sensor can be correlated to data from the second sensor to compare the data of the first performance characteristic to the data of the second performance characteristic, as indicated in block 710. If data from both sensors indicates a failure (e.g., data from the two sensors indicates contemporaneous abnormal first and second performance characteristics), the computing device can be configured to shut off the liquid jet. If, on the other hand, only one of the two sensors indicates a failure, the computing device can be configured to alert the user to a possible failure without automatically shutting off the liquid jet.

Some examples of the disclosed technology are further described below.

Example 1

An operational monitoring system for use with a liquid jet cutting system, the operational monitoring system comprising: an accelerometer coupled to a cutting head of the liquid jet cutting system and configured to generate motion data associated with movement of the cutting head; and a computing device operably connected to the accelerometer and having a memory and a processor; wherein: the memory stores a planned data set including expected parameters associated with movement of the cutting head along a planned cut path; and the computing device configured to receive the motion data from the accelerometer and correlate the motion data to the planned data set.

Example 2

The operational monitoring system of claim 1 wherein the liquid jet cutting system is a water jet cutting system.

Example 3

The operational monitoring system of claim 1 wherein the accelerometer is positioned adjacent an abrasive feed line in the cutting head, and wherein the accelerometer is configured to generate motion data associated with flow of abrasive through the abrasive feed line.

Example 4

The operational monitoring system of claim 1 wherein the accelerometer is mounted on a circuit board within the cutting head.

Example 5

The operational monitoring system of claim 1 wherein the motion data includes orientation of the cutting head.

Example 6

The operational monitoring system of claim 5 wherein the computing device is configured to generate an alarm signal when the orientation of the cutting head, as indicated by the accelerometer, is different from a planned orientation of the cutting head in the planned data set.

Example 7

The operational monitoring system of claim 1 wherein the computing device is configured to generate an alarm signal when a magnitude of the motion data generated by the accelerometer exceeds a threshold value.

Example 8

The operational monitoring system of claim 1 wherein the computing device is configured to filter the motion data generated by the accelerometer by at least one frequency value.

Example 9

The operational monitoring system of claim 1, further comprising a sensor operably connected to the computing device and configured to generate sensor data corresponding to one or more characteristics of the liquid jet cutting system.

Example 10

The operational monitoring system of claim 9 wherein the sensor includes a second accelerometer, an audio sensor, a temperature sensor, a pressure sensor, an electrostatic sensor, a continuity sensor, a micro-electromechanical system, and/or an impact switch.

Example 11

The operational monitoring system of claim 9 wherein the sensor is a temperature sensor connected to the cutting head and configured to monitor a temperature of one or more portions of the cutting head.

Example 12

The operational monitoring system of claim 11 wherein the temperature sensor is configured to monitor a temperature of a nozzle of the cutting head.

Example 13

The operational monitoring system of claim 9 wherein the computing device is configured to generate an alarm signal if both the motion data and the sensor data indicate deviations from the planned data set greater than a threshold value.

Example 14

The operational monitoring system of claim 9 wherein the computing device is configured to filter out portions of the motion data and/or of the sensor data associated with ambient conditions.

Example 15

The operational monitoring system of claim 9 wherein the computing device is configured to filter out baseline vibration of the cutting head associated with powering the liquid jet cutting system.

Example 16

The operational monitoring system of claim 9 wherein one or both of the accelerometer and the sensor are embedded in an electrical cable of the liquid jet cutting system.

Example 17

The operational monitoring system of claim 1 wherein the accelerometer is connected to the cutting head using a magnet.

Example 18

The operational monitoring system of claim 1 wherein the computing device is configured to generate an alarm signal when the motion data indicates one or more components are vibrating at their respective resonant frequencies.

Example 19

An operational monitoring system for use with a liquid jet cutting system, the operational monitoring system comprising: an accelerometer coupled to a component of the liquid jet cutting system and configured to generate motion data associated with movement of the component of the liquid jet cutting system; a sensor configured to generate sensor data corresponding to one or more characteristics of the liquid jet cutting system; and a computing device operably connected to the accelerometer and to the sensor, the computing device having a memory and a processor and being configured to: receive the motion data and the sensor data; and determine whether: the motion data indicates a first performance characteristic; and the sensor data indicates a second performance characteristic.

Example 20

The operational monitoring system of claim 19 wherein the first performance characteristic is an acceleration of the component greater than a threshold movement value.

Example 21

The operational monitoring system of claim 20 wherein the first performance characteristic indicates contact between a cutting head of the liquid jet cutting system and a workpiece.

Example 22

The operational monitoring system of claim 21 wherein the first performance characteristic indicates scraping of the cutting head along a surface of the workpiece.

Example 23

The operational monitoring system of claim 21 wherein the first performance characteristic indicates impact of the cutting head with a tipped-up part of the workpiece.

Example 24

The operational monitoring system of claim 19 wherein the second performance characteristic is a sound having a magnitude greater than a threshold sound value, a temperature greater than a threshold temperature value, a pressure within a component outside of a threshold pressure range, an acceleration or deceleration of a component of the liquid jet cutting system greater than a second threshold movement value, and/or an impact having a magnitude greater than a threshold impact value.

Example 25

The operational monitoring system of claim 19 wherein the computing device is configured to shut off the liquid jet cutting system if the motion data indicates the first performance characteristic and the sensor data indicates the second performance characteristic.

Example 26

The operational monitoring system of claim 19 wherein the first performance characteristic is an acceleration of the accelerometer in a first direction greater than a threshold acceleration value.

Example 27

The operational monitoring system of claim 26 wherein the first direction is parallel to a longitudinal axis of a cutting head of the liquid jet cutting system.

Example 28

The operational monitoring system of claim 26 wherein the first direction is perpendicular to a longitudinal axis of a cutting head of the liquid jet cutting system.

Example 29

The operational monitoring system of claim 19 wherein the accelerometer is coupled to a cutting head of the liquid jet cutting system and the sensor is a second accelerometer coupled to an actuator of the liquid jet cutting system upstream of the cutting head.

Example 30

A method of monitoring operation of a liquid jet cutting system, the method comprising: monitoring acceleration of a cutting head of the liquid jet cutting system using an accelerometer; generating motion data indicating acceleration of the cutting head; receiving the motion data from the accelerometer at a computing device having a memory and a processor; correlating, using the computing device, the motion data with planned data, wherein the planned data reflects normal operating motions and/or operating conditions associated with a planned cut; indicating a condition of the liquid jet cutting system based on one or more correlations between the motion data and the planned data.

Example 31

The method of claim 30, further comprising generating an alarm signal, via the computing device, if the condition of the liquid jet cutting system indicates wear on a component of the liquid jet cutting system beyond an acceptable wear value.

Example 32

The method of claim 30, further comprising generating an alarm signal, via the computing device, if the motion data indicates an acceleration of the cutting head greater than an acceptable acceleration value.

Example 33

The method of claim 30 wherein the liquid jet cutting system is a water jet cutting system.

Example 34

The method of claim 30 wherein the accelerometer is configured to monitor abrasive flow through an abrasive feed line in the cutting head.

Example 35

The method of claim 30 wherein the accelerometer is mounted on a circuit board within the cutting head.

Example 36

The method of claim 30 wherein the accelerometer is integrated into a cable of the liquid jet cutting system.

Example 37

The method of claim 30, further comprising correlating motion data with known resonant frequencies of one or more components of the liquid jet cutting system.

Example 38

The method of claim 37, further comprising generating an alarm signal if the motion data indicates that one or more components are vibrating at resonant frequencies.

Example 39

A method of monitoring operation of a liquid jet cutting system, the method comprising: monitoring acceleration of a component of the liquid jet cutting system using an accelerometer; generating motion data, using the accelerometer, indicating acceleration of the component; monitoring one or more characteristics of one or more components of the liquid jet cutting system using a sensor; generating characteristic data, using the sensor, indicating the one or characteristics of the one or more components of the liquid jet cutting system; receiving, at a computing device having a memory and a processor, the motion data from the accelerometer and the characteristic data from the sensor; correlating, using the computing device, the motion data with the characteristic data; determining a failure within the liquid jet cutting system via the correlation between the motion data and the characteristic data.

Example 40

The method of claim 39 wherein the accelerometer is a first accelerometer and the sensor is a second accelerometer.

Example 41

The method of claim 40 wherein the second accelerometer is positioned on a portion of a pump of the liquid jet cutting system and the method further includes monitoring vibration of one or more components of the pump.

Example 42

The method of claim 39 wherein the accelerometer is integrated into a cable of the liquid jet cutting system.

Example 43

The method of claim 39 wherein the sensor a second accelerometer, an audio sensor, a temperature sensor, an electrostatic sensor, a continuity sensor, a micro-electromechanical system, and/or an impact switch.

4 Example 4

The method of claim 39 wherein the one or more characteristics include acceleration, noise, and/or temperature.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

As one of ordinary skill in the art will appreciate, embodiments of the operational monitoring systems described herein can reduce the need for operator involvement and can provide faster and more reliable detection of faults, failures, or other adverse phenomena within a liquid jet cutting system. Such advantages can be achieved, for example, by automating the detection of anomalous performance characteristics of one or more components of liquid jet cutting system. Rather than relying on operator's unique experience and/or expertise to determine anomalies in the liquid jet cutting system, sensors can be used to precisely and objectively monitor performance characteristics of components of the system and compare those performance characteristics to predetermined "normal" or "acceptable" (e.g., planned) characteristic values, and/or to other characteristics monitored by other sensors in the system.

Other advantages of embodiments of the systems, devices and methods described herein to monitor operation of the liquid jet cutting system include: increased life of components of the liquid jet cutting system (e.g., via quick shutdown of the liquid jet cutting system during a failure); reduction in waste associated with scrapped workpieces damaged by faulty liquid jet cutting systems; reduction in determination of false positives (e.g., more assurance that the detected failures are genuine).

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. The teachings of the present disclosure provided herein can be applied to other systems, not necessarily the system described above. The elements and acts of the various embodiments described above can be combined to provide further embodiments. All of the patents and applications and other references identified herein, including any that may be listed in accompanying filing papers, are incorporated herein by reference. Aspects of the present disclosure can be modified, if necessary, to employ the systems, functions, and concepts of the various references described above to provide yet further embodiments of the present disclosure.

In general, the terms used in the following claims should not be construed to limit the present disclosure to the specific embodiments disclosed in the specification, unless the above Detailed Description section explicitly defines such terms. Accordingly, the actual scope of the present disclosure encompasses not only the disclosed embodiments, but also all equivalent ways of practicing or implementing the present disclosure.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims. Moreover, although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. An operational monitoring system for use with a liquid jet cutting system, the operational monitoring system comprising:
   an accelerometer coupled to a cutting head of the liquid jet cutting system and configured to generate motion data associated with movement of the cutting head; and
   a computing device operably connected to the accelerometer and having a memory and a processor;
   wherein:
      the memory stores a planned data set including expected performance characteristics associated with a liquid jet of the liquid jet cutting system, but unassociated with movement of the cutting head along a planned cut path; and
      the processor is configured to receive the motion data from the accelerometer and correlate the motion data to the planned data set.

2. The operational monitoring system of claim 1 wherein the liquid jet cutting system is a water jet cutting system.

3. The operational monitoring system of claim 1 wherein the accelerometer is mounted on a circuit board within the cutting head.

4. The operational monitoring system of claim 1 wherein the motion data includes orientation of the cutting head.

5. The operational monitoring system of claim 4 wherein the computing device is configured to generate an alarm signal when the orientation of the cutting head, as indicated by the accelerometer, is different from a planned orientation of the cutting head in the planned data set.

6. The operational monitoring system of claim 1 wherein the computing device is configured to generate an alarm signal when a magnitude of the motion data generated by the accelerometer exceeds a threshold value.

7. The operational monitoring system of claim 1 wherein the computing device is configured to filter the motion data generated by the accelerometer by at least one frequency value.

8. The operational monitoring system of claim 1, further comprising a sensor operably connected to the computing device and configured to generate sensor data corresponding to one or more characteristics of the liquid jet cutting system.

9. The operational monitoring system of claim 8 wherein the sensor includes a second accelerometer, an audio sensor, a temperature sensor, a pressure sensor, an electrostatic sensor, a continuity sensor, a micro-electromechanical system, and/or an impact switch.

10. The operational monitoring system of claim 8 wherein the sensor is a temperature sensor connected to the cutting head and configured to monitor a temperature of one or more portions of the cutting head.

11. The operational monitoring system of claim 10 wherein the temperature sensor is configured to monitor a temperature of a nozzle of the cutting head.

12. The operational monitoring system of claim 8 wherein the computing device is configured to generate an alarm signal if both the motion data and the sensor data indicate deviations from the planned data set greater than a threshold value.

13. The operational monitoring system of claim 8 wherein the computing device is configured to filter out portions of the motion data and/or of the sensor data associated with ambient conditions.

14. The operational monitoring system of claim 8 wherein the computing device is configured to filter out baseline vibration of the cutting head associated with powering the liquid jet cutting system.

15. The operational monitoring system of claim 8 wherein one or both of the accelerometer and the sensor are embedded in an electrical cable of the liquid jet cutting system.

16. The operational monitoring system of claim 1 wherein the accelerometer is connected to the cutting head using a magnet.

17. An operational monitoring system for use with a liquid jet cutting system, the operational monitoring system comprising:
    an accelerometer coupled to a cutting head of the liquid jet cutting system, wherein the accelerometer is positioned adjacent an abrasive feed line in the cutting head, and wherein the accelerometer is configured to generate motion data associated with a flow of abrasive through the abrasive feed line; and
    a computing device operably connected to the accelerometer and having a memory and a processor;
    wherein:
        the memory stores a planned data set including expected parameters associated with the flow of abrasive through the abrasive feed line; and
        the computing device is configured to receive the motion data from the accelerometer and correlate the motion data to the planned data set.

18. An operational monitoring system for use with a liquid jet cutting system, the operational monitoring system comprising:
    an accelerometer coupled to a cutting head of the liquid jet cutting system and configured to generate motion data associated with movement of the cutting head; and
    a computing device operably connected to the accelerometer and having a memory and a processor;
    wherein:
        the memory stores a planned data set including expected parameters associated with movement of the cutting head along a planned cut path;
        the computing device is configured to receive the motion data from the accelerometer and correlate the motion data to the planned data set; and
        the computing device is further configured to generate an alarm signal when the motion data indicates one or more components are vibrating at their respective resonant frequencies.

19. An operational monitoring system for use with a liquid jet cutting system, the operational monitoring system comprising:
    an accelerometer coupled to a component of the liquid jet cutting system and configured to generate motion data associated with movement of the component of the liquid jet cutting system;
    a sensor configured to generate sensor data corresponding to one or more characteristics of the liquid jet cutting system; and
    a computing device operably connected to the accelerometer and to the sensor, the computing device having a memory and a processor and being configured to:
        store, via the memory, a planned data set including (i) expected performance characteristics associated with a liquid jet of the liquid jet cutting system, but unassociated with movement of the component, and (ii) expected parameters associated with movement of the component;
        receive the motion data and the sensor data;
        correlate, via the processor, the motion data to (ii) the expected parameters associated with movement of the component to determine whether the motion data indicates a first performance characteristic associated with movement of the component; and
        correlate, via the processor, the sensor data to (i) the expected performance characteristics associated with the liquid jet to determine whether the sensor data indicates a second performance characteristic indicative of liquid jet condition or performance unrelated to movement of the component.

20. The operational monitoring system of claim 19 wherein the first performance characteristic is an acceleration of the component greater than a threshold movement value.

21. The operational monitoring system of claim 19 wherein the second performance characteristic is a sound having a magnitude greater than a threshold sound value, a temperature greater than a threshold temperature value, a pressure within a component outside of a threshold pressure range, an acceleration or deceleration of a component of the liquid jet cutting system greater than a second threshold movement value, and/or an impact having a magnitude greater than a threshold impact value.

22. The operational monitoring system of claim 19 wherein the computing device is configured to shut off the liquid jet cutting system if the motion data indicates the first performance characteristic and the sensor data indicates the second performance characteristic.

23. The operational monitoring system of claim 19 wherein the first performance characteristic is an acceleration of the accelerometer in a first direction greater than a threshold acceleration value.

24. The operational monitoring system of claim 23 wherein the first direction is parallel to a longitudinal axis of a cutting head of the liquid jet cutting system.

25. The operational monitoring system of claim 23 wherein the first direction is perpendicular to a longitudinal axis of a cutting head of the liquid jet cutting system.

26. The operational monitoring system of claim 19 wherein the accelerometer is coupled to a cutting head of the liquid jet cutting system and the sensor is a second accelerometer coupled to an actuator of the liquid jet cutting system upstream of the cutting head.

27. An operational monitoring system for use with a liquid jet cutting system, the operational monitoring system comprising:
    an accelerometer coupled to a component of the liquid jet cutting system and configured to generate motion data associated with movement of the component of the liquid jet cutting system;
    a sensor configured to generate sensor data corresponding to one or more characteristics of the liquid jet cutting system; and
    a computing device operably connected to the accelerometer and to the sensor, the computing device having a memory and a processor and being configured to:

receive the motion data and the sensor data; and
determine whether:
    the motion data indicates a first performance characteristic,
    wherein the first performance characteristic indicates contact between a cutting head of the liquid jet cutting system and a workpiece; and
    the sensor data indicates a second performance characteristic.

28. The operational monitoring system of claim 27 wherein the first performance characteristic indicates scraping of the cutting head along a surface of the workpiece.

29. The operational monitoring system of claim 27 wherein the first performance characteristic indicates impact of the cutting head with a tipped-up part of the workpiece.

30. An operational monitoring system for use with a liquid jet cutting system, the operational monitoring system comprising:
    an accelerometer sensor coupled to a cutting head of the liquid jet cutting system and configured to generate motion data associated with movement of the cutting head; and
    a computing device operably connected to the accelerometer sensor and having a memory and a processor;
wherein:
    the memory is configured to store a planned data set including expected parameters associated with movement of the cutting head along a planned cut path; and
    the processor is configured to receive the motion data from the accelerometer sensor and correlate the motion data to the planned data set to determine whether the motion data indicates contact between the cutting head and a workpiece.

31. The operational monitoring system of claim 30 wherein the motion data includes orientation of the cutting head.

32. The operational monitoring system of claim 30 wherein the computing device is configured to determine whether the motion data indicates scraping of the cutting head along a surface of the workpiece.

33. The operational monitoring system of claim 30 wherein the computing device is configured to determine whether the motion data indicates impact of the cutting head with a tipped-up part of the workpiece.

\* \* \* \* \*